US012264684B2

(12) United States Patent
Lazar et al.

(10) Patent No.: US 12,264,684 B2
(45) Date of Patent: Apr. 1, 2025

(54) SYSTEM, APPARATUS, AND METHOD FOR PROVIDING A FLOW OF AIR

(71) Applicant: SNOOZ, Inc., Las Vegas, NV (US)

(72) Inventors: Eli Stewart Lazar, Champaign, IL (US); Matthew Melvin George Snyder, Henderson, NV (US)

(73) Assignee: SNOOZ, INC., Las Vegas, NV (US)

( * ) Notice: Subject to any disclaimer, the term of this patent is extended or adjusted under 35 U.S.C. 154(b) by 660 days.

(21) Appl. No.: 17/391,629

(22) Filed: Aug. 2, 2021

(65) Prior Publication Data
US 2022/0042517 A1 Feb. 10, 2022

Related U.S. Application Data

(60) Provisional application No. 63/063,587, filed on Aug. 10, 2020.

(51) Int. Cl.
 *F04D 27/00* (2006.01)
 *F04D 17/02* (2006.01)
 *F04D 25/08* (2006.01)
 *F04D 29/40* (2006.01)
 *F04D 29/66* (2006.01)

(52) U.S. Cl.
 CPC ......... *F04D 27/004* (2013.01); *F04D 17/025* (2013.01); *F04D 25/088* (2013.01); *F04D 29/403* (2013.01); *F04D 29/661* (2013.01)

(58) Field of Classification Search
 CPC .... F04D 27/004; F04D 17/025; F04D 25/088; F04D 29/403; F04D 29/661; F04D 25/166; F04D 29/4226; F04D 29/663; Y02B 30/70
 See application file for complete search history.

(56) References Cited

U.S. PATENT DOCUMENTS

| 2,486,619 | A | * | 11/1949 | Troxler | A47L 5/22 15/422.2 |
| 10,510,335 | B2 | | 12/2019 | Lazar | |
| 11,506,211 | B2 | * | 11/2022 | Li | F04D 29/329 |
| 2016/0195097 | A1 | * | 7/2016 | Patrick | F04D 29/5806 415/124.2 |

(Continued)

FOREIGN PATENT DOCUMENTS

CN 209053822 U * 7/2019
CN 209180067 U * 7/2019

OTHER PUBLICATIONS

Raw Machine Translation of CN209180067U, Hu, "Counter-Rotating Fan", Jul. 30, 2019.*

(Continued)

*Primary Examiner* — Charles G Freay
*Assistant Examiner* — Lilya Pekarskaya
(74) *Attorney, Agent, or Firm* — McCarter & English, LLP; James M. Smedley; Alex Korona

(57) ABSTRACT

An apparatus is disclosed. The apparatus has a first housing having a first cavity, a second housing disposed in the first housing and including a second cavity and at least one aperture, a first fan assembly configured to generate a first airflow through the first housing, and a second fan assembly configured to generate a second airflow from the second cavity to the first cavity via the at least one aperture.

9 Claims, 15 Drawing Sheets

(56) References Cited

U.S. PATENT DOCUMENTS

| | | | | |
|---|---|---|---|---|
| 2018/0023579 | A1* | 1/2018 | Park | F04D 29/703 |
| | | | | 310/40.5 |
| 2019/0348019 | A1* | 11/2019 | Lazar | G10K 15/04 |
| 2020/0208871 | A1* | 7/2020 | Yamamoto | F04D 27/004 |
| 2022/0010799 | A1* | 1/2022 | Park | F24F 13/10 |
| 2022/0034326 | A1* | 2/2022 | Seo | F04D 25/166 |

OTHER PUBLICATIONS

Raw Machine Translation of CN209053822 (U), Li, "Counter-Rotating Fan", Jul. 2, 2019.*

* cited by examiner

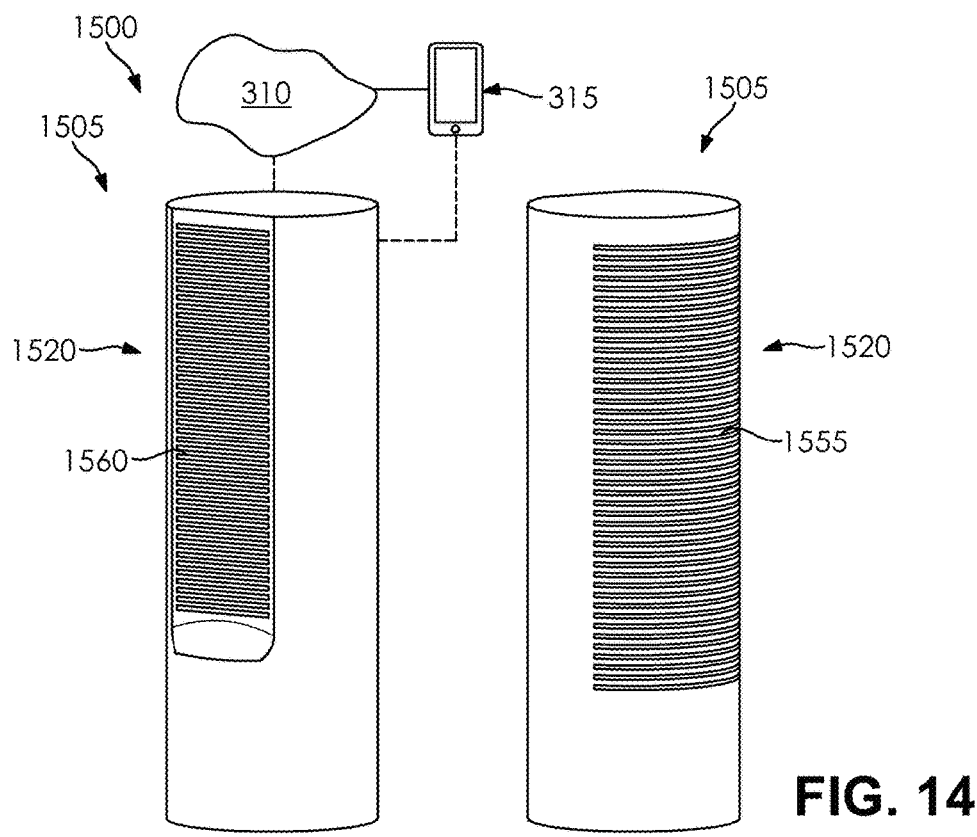
FIG. 13
FIG. 14
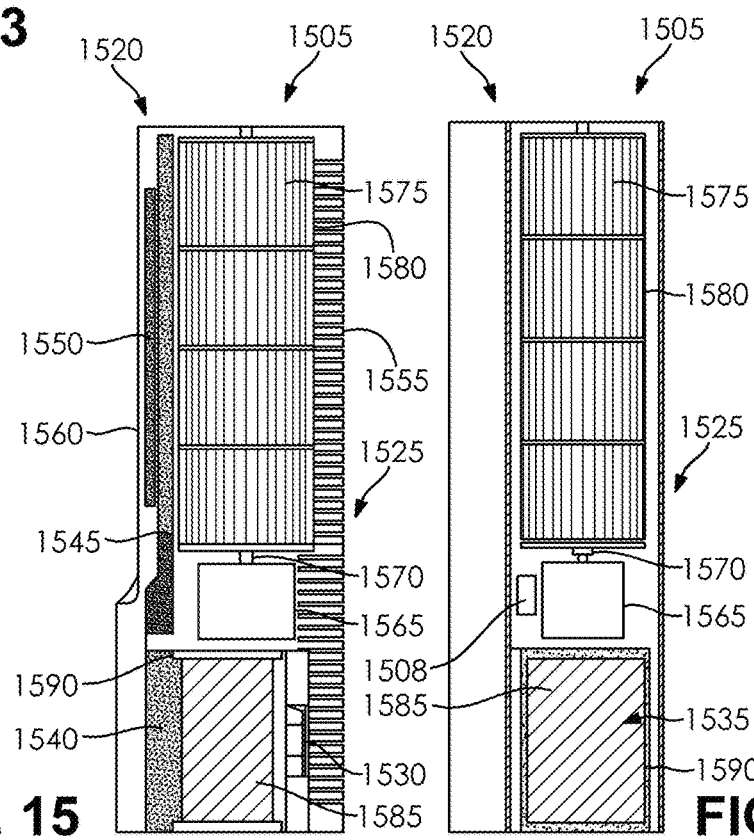
FIG. 15
FIG. 16

SYSTEM, APPARATUS, AND METHOD FOR PROVIDING A FLOW OF AIR

RELATED APPLICATIONS

This application claims the benefit of U.S. Provisional Patent Application No. 63/063,587 filed Aug. 10, 2020, which is hereby incorporated by reference in its entirety.

TECHNICAL FIELD

The present disclosure generally relates to a system, apparatus, and method for providing a flow, and more particularly to a system, apparatus, and method for providing a flow of air.

BACKGROUND

Systems for providing a flow of air include fans and blowers. Most fans generate sounds with similar acoustics, which are based on rotating fan blade designs. Existing fan acoustics are usually dependent on fan diameter and fan speed.

Conventional fans typically generate noise at similar frequencies throughout operation. Also for example, conventional fans typically generate airflow at the tips of the fan blades, which contributes to the way it sounds.

Based on the above typical operation for generating airflow at the tips of fan blades, a volume of noise generated by conventional fans is typically not adjustable without changing a fan diameter or speed, and thereby changing the airflow. Accordingly, for a given amount of airflow, conventional fans create the same level of noise during operation, whether at night, during the day, during work hours, or after work hours. However, it is desirable for a level of noise to be adjusted depending on whether it is day or night, work hours or after work hours, and/or based on other factors that may be variable depending on a given time during the day.

A typical fan includes an arrangement of fan blades that are rotated via an electrical motor. The rotation is facilitated by a fan hub, which is a structural element that connects the fan blades and the motor so that the fan hub and fan blades rotate in unison to generate a flow of air. The fan hub in conventional systems is usually either a neutral element that negligibly affects airflow and fan acoustics or a component that negatively impacts airflow. Conventional fan hubs may negatively impact airflow because low-pressure areas around the fan hub may create an unintended airflow path, allowing for unwanted recirculation.

Conventional systems for cooling a space such as bedrooms in a home during sleeping hours include centralized air conditioning having a HVAC blower fan that is typically biased toward one side of the home, which makes it difficult to achieve equal cooling airflow output for each room. Also, thermostats that control air conditioning are typically centrally located in a home at a location where airflow output performs relatively well, making it difficult to detect and correct temperature imbalances.

Also, during nighttime sleeping hours, occupants often close their bedroom doors. Closing doors significantly restricts convection processes, making it difficult for a temperature imbalance in a home to be naturally corrected. As a result, many homes have rooms that "run hot" during the night, with occupants waking up hot and finding themselves getting warmer throughout the night.

Localized temperature control is sometimes used to address the above problems with temperature imbalances in rooms. However, in attempting to cool an isolated space such as a closed bedroom (according to the second law of thermodynamics), a net increase in heat energy results. Accordingly, air conditioning condensers are placed outside of the home, and portable or window air conditioning units utilize ventilation to release heat. Similarly, refrigerators operate to keep stored food cold at the expense of heating up the space in which the refrigerators are located. Other devices such as evaporative coolers also operate on this principle, in which a net heat increase is stored as a phase change for water. Accordingly, existing systems involve challenges regarding residual heat energy.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a first housing having a first cavity, a second housing disposed in the first housing and including a second cavity and at least one aperture, a first fan assembly configured to generate a first airflow through the first housing, and a second fan assembly configured to generate a second airflow from the second cavity to the first cavity via the at least one aperture.

In another aspect, the present disclosure is directed to a method. The method includes providing a first housing having a first cavity, disposing a second housing, which includes a second cavity and at least one aperture, in the first cavity, generating a first airflow through the first housing using a first fan assembly, and generating a second airflow from the second cavity to the first cavity via the at least one aperture using a second fan assembly.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still be within the spirit of the disclosure as described herein.

FIG. 13 illustrates a perspective view of at least some exemplary embodiments of the present disclosure;

FIG. 14 illustrates a perspective view of at least some exemplary embodiments of the present disclosure;

FIG. 15 illustrates a sectional view of at least some exemplary embodiments of the present disclosure;

FIG. 16 illustrates a sectional view of at least some exemplary embodiments of the present disclosure;

DETAILED DESCRIPTION AND INDUSTRIAL APPLICABILITY

Figure 1:
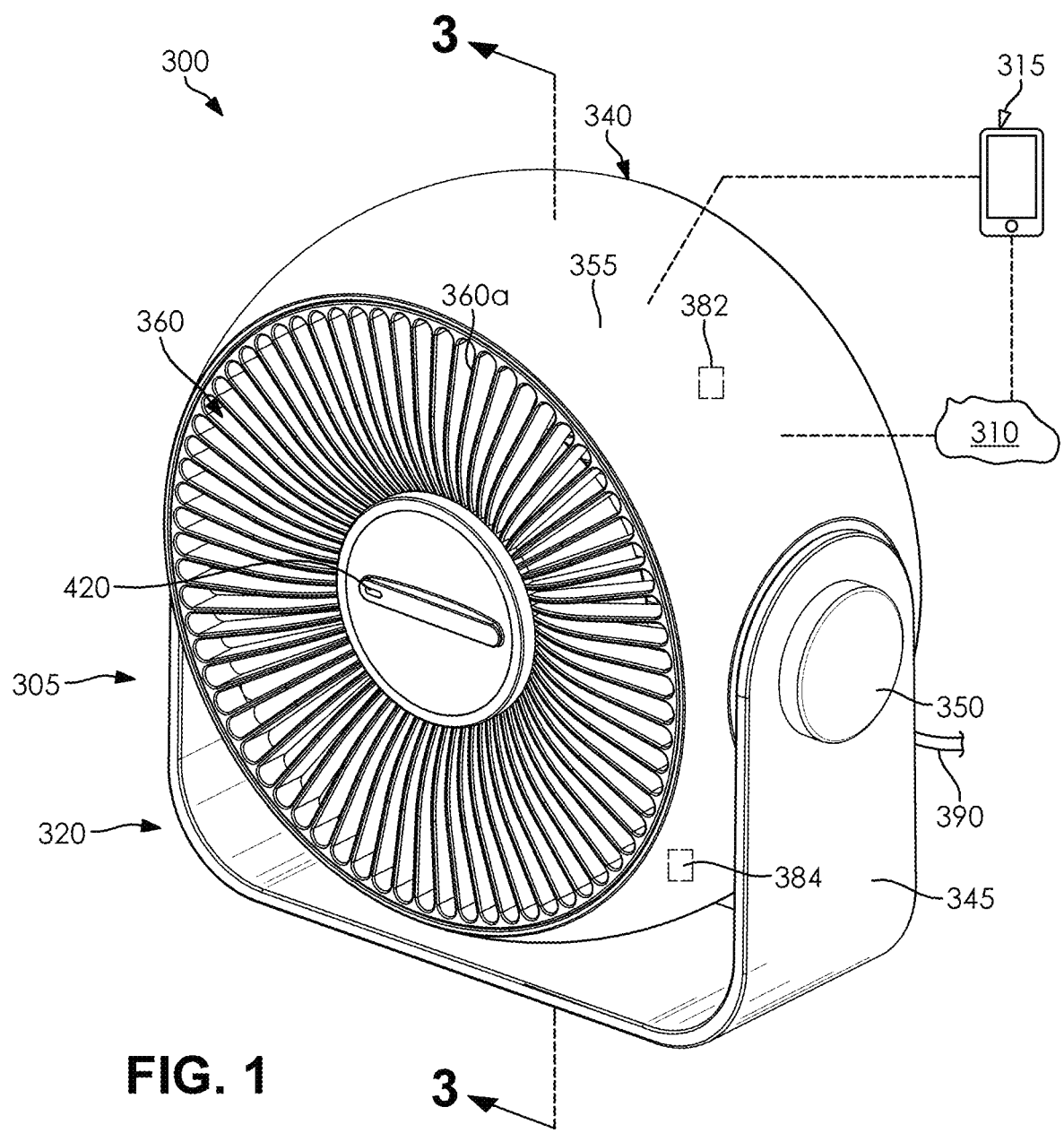
FIG. 1 illustrates a perspective view of at least some exemplary embodiments of the present disclosure.

The exemplary disclosed system, apparatus, and method may include a system for providing a flow of air such as, for example, a fan or a blower. In at least some exemplary embodiments, the exemplary disclosed system, apparatus, and method may be used in any suitable application for cooling and heating.

In at least some exemplary embodiments and as illustrated in FIGS. 1-4, the exemplary disclosed system, apparatus, and method may include a system 300. System 300 may include an apparatus 305, a network 310, and one or more user devices 315. Apparatus 305 may communicate with network 310 and with one or more user devices 315 either directly or via network 310 using any suitable communication technique for example as described herein. Network 310 may be any suitable network such as the exemplary disclosed network described below regarding FIG. 20.

User device 315 may be any suitable user device for receiving input and/or providing output (e.g., raw data or other desired information) to a user. User device 315 may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 300 (e.g., apparatus 305), and/or any other suitable user device or interface. For example, user device 315 may include a touchscreen device of a smartphone or handheld tablet. For example, user device 315 may include a display that may include a graphical user interface to facilitate entry of input by a user and/or receiving output. For example, system 300 may provide notifications to a user via output transmitted to user device 315. User device 315 may communicate with components of apparatus 305 by any suitable technique such as, for example, as described below.

Apparatus 305 may be a fan or a blower. In at least some exemplary embodiments, apparatus 305 may be a blade fan such as a 3-blade fan or fan having any suitable number of blades. In at least some exemplary embodiments, apparatus 305 may be a tone-adjusting fan for example as described herein. Apparatus 305 may include a structural assembly 320, a power control assembly 325, a first fan assembly 330, and a second fan assembly 335. Structural assembly 320 may structurally support power control assembly 325, first fan assembly 330, and second fan assembly 335. Power control assembly 325 may power and control an operation of first fan assembly 330 and second fan assembly 335.

Structural assembly 320 may be formed from plastic or polymer material (e.g., co-polymer material, thermoplastic and thermosetting polymers, resin-containing material, polyethylene, polystyrene, polypropylene, polyurethane, epoxy resins, and/or phenolic resins), metal, composite material, and/or any other suitable structural material. Structural assembly 320 may include a housing 340 and a stand 345. Stand 345 may movably support (e.g., rotatably support in one or more degrees of freedom such as a rotatable horizontal and/or rotatable vertical direction) housing 340 via one or more movable connectors 350 (e.g., a hinge).

Figure 2:
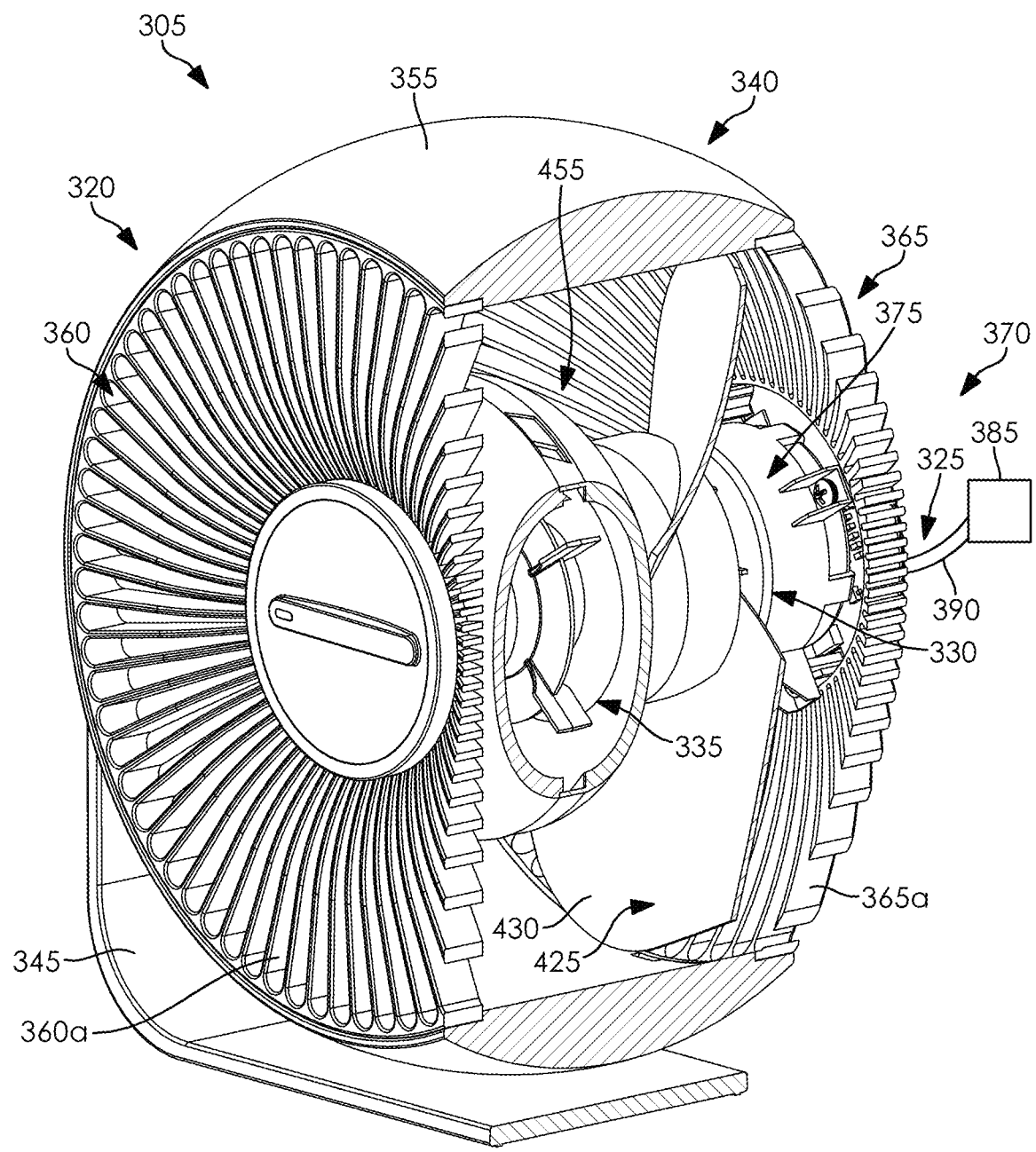
FIG. 2 illustrates a perspective, interior view of at least some exemplary embodiments of the present disclosure.
Figure 3:
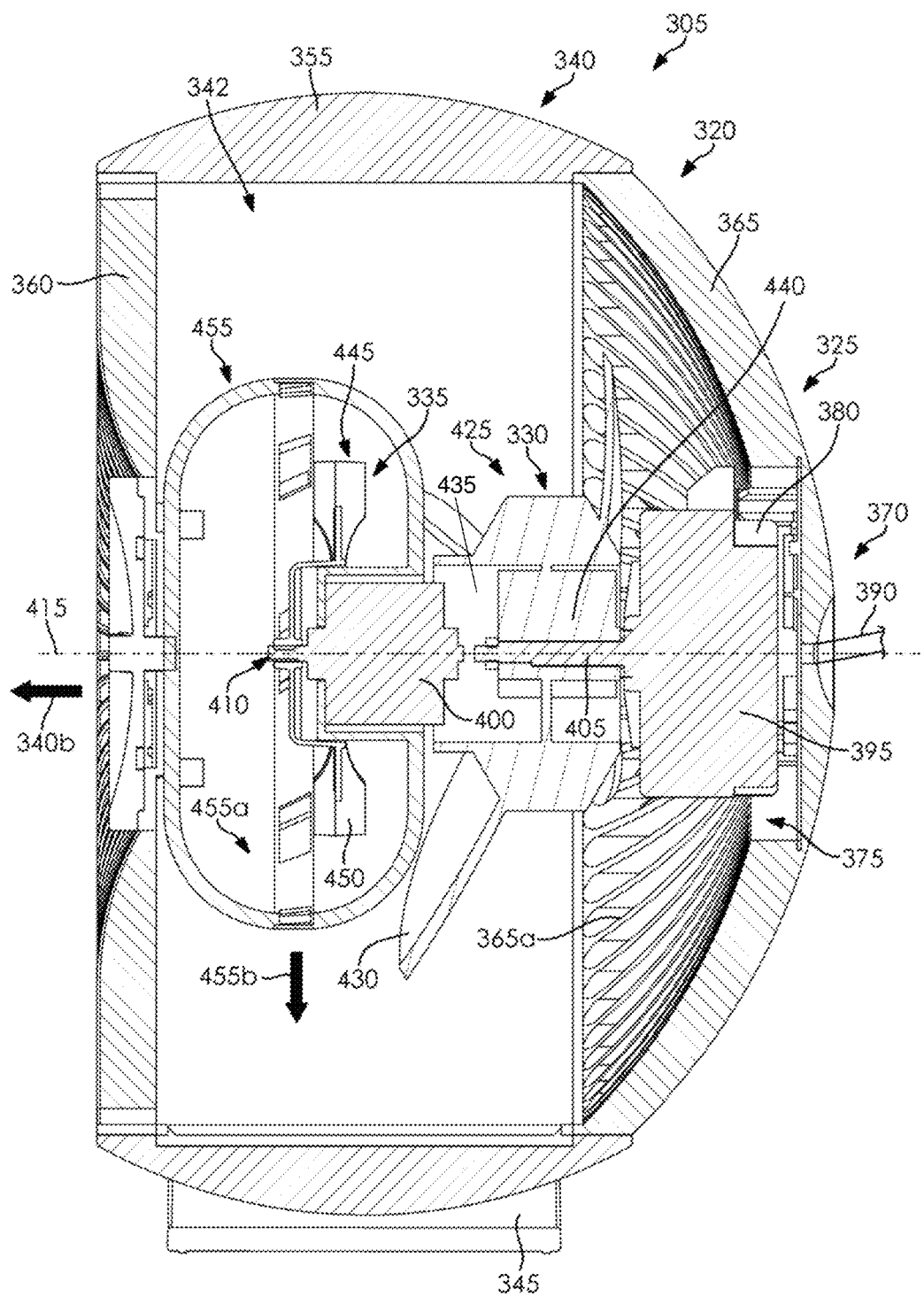
FIG. 3 illustrates a sectional view of at least some exemplary embodiments of the present disclosure.

Housing 340 may structurally support components of power control assembly 325, first fan assembly 330, and second fan assembly 335. Housing 340 may include a central member 355, a front member 360, and a rear member 365 that may form a first cavity 342. Central member 355 may be movably attached to stand 345 via one or more movable connectors 350. Front member 360 may be attached to a front portion of central member 355, and rear member 365 may be attached (e.g., fixedly or removably attached) to a rear portion of central member 355, via any suitable technique such as mechanical fasteners (e.g., screws), adhesives, press-fit, welding, and/or any other suitable technique. Central member 355, front member 360, and rear member 365 may also be integrally formed together. Components of power control assembly 325, first fan assembly 330, and second fan assembly 335 may be movably supported partially or substantially entirely within housing 340 between front member 360 and rear member 365 for example as illustrated in FIGS. 2 and 3. Front member 360 and rear member 365 may include fan guards (e.g., fan grills) including a plurality of grill members (e.g., grill members 360a and grill members 365a) that may form a plurality of apertures through which a flow of air may pass through housing 340.

Power control assembly 325 may include a power assembly 370, a motor assembly 375, a controller 380, a user interface 382, and a sensor 384. Power assembly 370 may power motor assembly 375 and controller 380. Controller 380 may control an operation of power assembly 370 and motor assembly 375.

Power assembly 370 may include any suitable components for transferring power to motor assembly 375 and controller 380. Power assembly 370 may include a power device 385 that may be a plug that may connect to an electrical power source (e.g., a wall outlet, generator outlet, or other power source) via an electrical connector 390 such as a power cable, wire, or cord. Power device 385 may also include a battery, a renewable power source (e.g., a solar power assembly), and/or any other suitable power device. For example, power device 385 may include a battery (e.g., a disposable or a rechargeable battery) such as a nickel-metal hydride battery, a lithium-ion battery, an ultracapacitor battery, a lead-acid battery, and/or a nickel cadmium battery.

Motor assembly 375 may be any suitable assembly for being powered by power assembly 370 to drive first fan assembly 330 and second fan assembly 335. Motor assembly 375 may include one or more motors, engines, drives, and/or any other suitable devices for driving first fan assembly 330 and second fan assembly 335. For example, motor assembly 375 may include a double shaft motor, a geared double shaft motor, and/or an assembly using two separate motors.

As illustrated in FIG. 3, motor assembly 375 may include a first motor 395 that may drive first fan assembly 330 and a second motor 400 that may drive second fan assembly 335. For example, first motor 395 may drive (e.g., rotate) a first shaft 405 that may be attached between first motor 395 and first fan assembly 330 to drive a blade assembly of first fan assembly 330. Second motor 400 may drive (e.g., rotate) a second shaft 410 that may be attached between second motor 400 and second fan assembly 335 to drive a blade assembly of second fan assembly 335. First motor 395 and second motor 400 may be any suitable type of motor, engine, or drive for driving first shaft 405 and second shaft 410 such as, for example, an electric motor such as an AC or DC brushed or brushless motor, a servo motor, a stepper motor, a direct drive motor, or a linear motor.

First shaft 405 and second shaft 410 may be concentric shafts that may rotate about a same axis 415 (e.g., central axis). In at least some exemplary embodiments, one of first shaft 405 and second shaft 410 may be disposed in (e.g., partially in or substantially entirely in) the other of first shaft 405 and second shaft 410. For example, some or substantially an entire length of second shaft 410 may be disposed within first shaft 405. First shaft 405 and second shaft 410 may be any suitable driveshafts such as, for example, an elongated structural shaft or rod (e.g., a metal shaft or rod).

First motor 395 may operate to rotate first shaft 405 and first fan assembly 330 in a first rotational direction (e.g., first direction of rotation). Second motor 400 may operate to rotate second shaft 410 and second fan assembly 335 in a second rotational direction (e.g., second direction of rotation). The first direction of rotation may be opposite to the second direction of rotation. That is, first motor 395 may operate to rotate first shaft 405 and first fan assembly 330 in the first direction of rotation that may be opposite to the second direction of rotation in which second motor 400 may operate to rotate second shaft 410 and second fan assembly 335. In at least some exemplary embodiments, the first direction of rotation may be clockwise and the second direction of rotation may be counterclockwise (e.g., as viewed from the front of apparatus 305). In at least some exemplary embodiments, the first direction of rotation may be counterclockwise and the second direction of rotation may be clockwise (e.g., as viewed from the front of apparatus 305). In at least some exemplary embodiments, spinning a fan of first fan assembly 330 in an opposite direction as a fan of second fan assembly 335 may reduce or cancel out residual torque (e.g., a portion of residual torque) of apparatus 305. For example, apparatus 305 may run relatively more smoothly based on residual torque being canceled out by a fan of first fan assembly 330 spinning in an opposite direction as a fan of second fan assembly 335. First motor 395 and second motor 400 may also operate to respectively rotate first fan assembly 330 and second fan assembly 335 about axis 415 in the same direction (e.g., either clockwise or counterclockwise as viewed from the front of apparatus 305). In at least some exemplary embodiments, a single motor assembly may drive first fan assembly 330 and second fan assembly 335 for example as described above using a single shaft assembly.

In at least some exemplary embodiments, first shaft 405 and second shaft 410 may be concentric shafts. First motor 395 may drive first shaft 405 and components of first fan assembly 330 in an opposite direction as second shaft 410 and components of second fan assembly 335 driven by second motor 400. Such opposite direction of rotation may help minimize torque on components of apparatus 305.

Controller 380 may be disposed in or on housing 340 for example as illustrated in FIG. 3. Controller 380 may control an operation of the exemplary disclosed components of apparatus 305. Controller 380 may include for example a processor (e.g., micro-processing logic control device) or board components. Also for example, controller 380 may include input/output arrangements that allow it to be connected (e.g., via wireless, Wi-Fi, Bluetooth, or any other suitable communication technique) to other components of system 300. For example, controller 380 may control an operation of apparatus 305 based on input received from an exemplary disclosed module of system 300 (e.g., as described below), user device 315, and/or input provided directly to monitoring device 305 by a user interface provided on apparatus 305 (e.g., via any suitable user interface such as a switch, keypad, button, and/or a touchscreen for example as described below). Controller 380 may communicate with components of system 300 via wireless communication, Wi-Fi, Bluetooth, network communication, internet, and/or any other suitable technique (e.g., as disclosed herein).

System 300 may include one or more modules that may be partially or substantially entirely integrated with one or more components of system 300 such as, for example, controller 380, user device 315 and/or any of the exemplary disclosed networks (e.g., cloud-based) or network devices described herein. The one or more modules may be software modules as described for example below regarding FIG. 19. For example, the one or more modules may include computer-executable code stored in non-volatile memory. The one or more modules (e.g., a module for Bluetooth communication, a module for Wi-Fi communication, a module for executing the exemplary disclosed algorithms, and/or any other suitable module) may store data and/or be used to control some or all of the exemplary disclosed processes described herein. The one or more modules may be used in conjunction with an application programming interface (API) for example as described herein (e.g., operated using user device 315).

Controller 380 may also operate to control any suitable displays or indicators disposed on apparatus 305. For example, controller 380 may control an operation of one or more display components 420. Display component 420 be a lighting element such as a light-emitting diode (LED), organic light-emitting diode (OLED), electroluminescent lighting element (ELs), and/or any other suitable lighting element. In at least some exemplary embodiments, display component 420 may indicate pairing (e.g., Bluetooth pairing or any other suitable type of pairing) of apparatus 305 with another device such as user device 315.

Controller 380 may be communicatively coupled with, exchange input and/or output with, and/or control any suitable component of apparatus 305. For example, controller 380 may be communicatively coupled with, exchange input and/or output with, and/or control first motor 395, second motor 400, and/or power device 385. Controller 380 may be communicatively coupled with first motor 395, second motor 400, and/or power device 385 (e.g., and any other suitable exemplary disclosed components of system 300 described herein) via electrical line or wire and/or via any other suitable exemplary disclosed technique such as wireless communication, Wi-Fi, Bluetooth, network communication, internet, and/or any other suitable technique (e.g., as disclosed herein). Controller 380 may also be similarly communicatively coupled with network 310, user device 315, and/or other devices either directly or via network 310.

User interface 382 may be disposed on or at housing 340 (e.g., or any other desired portion of apparatus 305). User interface 382 may include one or more knobs, switches, buttons (e.g., capacitive touch sensing button), and/or any other suitable devices for controlling first motor 395. A user may use user interface 382 to control a speed at which first motor 395 operates to rotate a first fan (e.g., a first blade assembly 425), thereby controlling an amount of airflow generated by first blade assembly 425. User interface 382 may also be used to turn first motor 395 on and off (e.g., by pressing a button or knob of user interface 382). Controller 380 may also communicate with and/or directly control first motor 395.

Sensor 384 may be disposed in or at housing 340 (e.g., or any other desired portion of apparatus 305). Sensor 384 may communicate with controller 380 and may provide sensed data to controller 380. Sensor 384 may include any suitable temperature sensor (e.g., an ambient temperature sensor). Sensor 384 may include a thermally sensitive resistor such as for example a thermistor. In at least some exemplary embodiments, sensor 384 may be a thermal-pulse-emitting sensor, a resistance temperature detector sensor, or a thermal-ribbon sensor. Controller 380 and/or the exemplary disclosed module may use and process the sensed data of sensor 384 to control first motor 395 to drive first blade assembly 425 faster, slower, or to turn on or off based on a sensed temperature (e.g., when the sensed temperature rises above or falls below a predetermined temperature or a temperature calculated by controller 380 and/or the exemplary disclosed module). Sensor 384 may also include a sound level sensor for sensing ambient noise or sound such as, for example, a sound level meter, sound pressure level reader, or a noise dosimeter (e.g., and controller 380 may similarly control system 300 based on sensed sound data for example as described above).

First fan assembly 330 may include first blade assembly 425 that may be attached to first shaft 405. First fan assembly 330 may be formed from materials similar to structural assembly 320. First blade assembly 425 may include a plurality of (e.g., two, three, or more) blades 430 that may be attached or integrally formed with a base 435. First blade assembly 425 may be supported in or on a support member 440 that may be attached to components of housing 340 and/or motor assembly 375. Support member 440 may support first blade assembly 425 as first motor 395 drives (e.g., rotates) first blade assembly 425. First blade assembly 425 may alternatively be directly supported and rotated via first shaft 405. Controller 380 may selectively drive first fan assembly 330 via first shaft 405 to generate a flow of air (e.g., for airflow generation) through first cavity 342 of housing 340.

Figure 6:
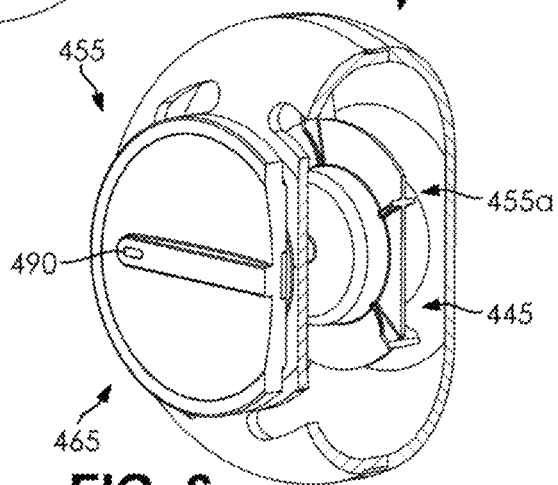
FIG. 6 illustrates a perspective, interior view of at least some exemplary embodiments of the present disclosure.

Second fan assembly 335 may be formed from materials similar to structural assembly 320. Second fan assembly 335 may include a second fan (e.g., a second blade assembly 445) that may be smaller than first blade assembly 425 and that may include a plurality (e.g., three, four, five, or more) of blades 450. First blade assembly 425 may have a first diameter that is greater than a second diameter of second blade assembly 445. Second blade assembly 445 may be supported in (e.g., within) a second housing 455 as illustrated in FIGS. 2, 3, and 6. For example as illustrated in FIG. 3, second housing 455 may be configured with a recess to receive second motor 400. Alternatively for example, second motor 400 may be disposed on or adjacent to second housing 455 and second shaft 410 may extend into second housing 455 to attach to and drive second blade assembly 445. Second housing 455 may be an acoustic enclosure. Second housing 455 may be for example a white noise generator housing. Second housing 455 may provide for shaping sound generated by apparatus 305 for example as described herein. In at least some exemplary embodiments, second blade assembly 445 may be an oversized, hybrid impeller.

For example as illustrated in FIGS. 5A, 5B, 5C, and 6, second housing 455 may include a base assembly 460 and a cover assembly 465. Base assembly 460 may be formed from one or a plurality of base members (e.g., base members 470 and 475) that may be attached together via any suitable technique such as, for example, mechanical fasteners (e.g., screws), adhesives, press-fit, welding, and/or any other suitable technique. Base assembly 460 may also be an integrally formed single member. Base assembly 460 may be configured to receive cover assembly 465. For example, base assembly 460 may be an annular, spherical, and/or oblate-shaped assembly having a convex surface that may receive cover assembly 465 that may be configured with a cavity (e.g., a concave cavity) shaped to fit on base assembly 460.

Figure 4:
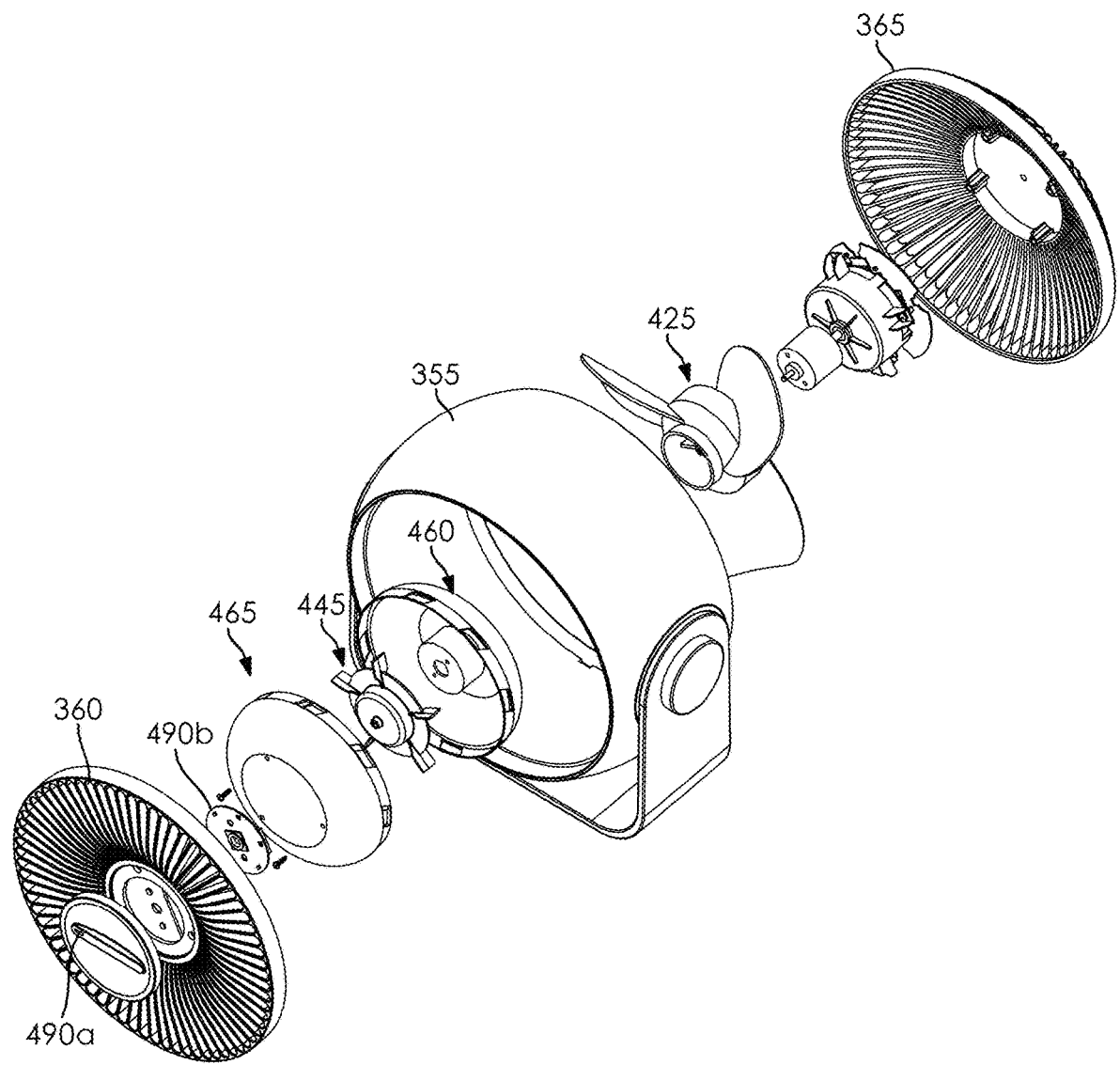
FIG. 4 illustrates a perspective, exploded view of at least some exemplary embodiments of the present disclosure.

Cover assembly 465 may be movably attached to base assembly 460 when cover assembly 465 is received on base assembly 460. For example, cover assembly 465 may be rotatably attached (e.g., via a hinge or other suitable pivoting device) to base assembly 460. Base assembly 460 may include a plurality of protrusions 480 that may be received in a plurality of apertures 485 of cover assembly 465. Apertures 485 may be grooves (e.g., curved grooves) that guide and bound a movement of protrusions 480 as cover assembly 465 is rotated relative to base assembly 460. Cover assembly 465 may thereby be configured to be rotated a predetermined distance or amount based on protrusions 480 being moved within or along respective apertures 485. Cover assembly 465 may be rotated relative to base assembly 460 for example based on a user gripping and manipulating (e.g., turning) an actuator 490. Actuator 490 may be for example a rotatable switch or dial fixedly attached to cover assembly 465 and movably (e.g., rotatably) attached to base assembly 460. In at least some exemplary embodiments, actuator 490 may serve as a hinge for rotatably attaching cover assembly 465 to base assembly 460 and may also provide a device for a user to rotate cover assembly 465 relative to base assembly 460 (e.g., base on protrusions 480 being received and guided in apertures 485). Actuator 490 may include one or members (e.g., members 490a and 490b) that may be attached to front member 360 of housing 340 and cover assembly 465 for example as illustrated in FIG. 4. Actuator 490 may also include actuation components (e.g., an electrical motor or actuator such as an electric actuator) that may move or turn actuator 490 and cover assembly 465 relative to base assembly 460 based on control by controller 380. Actuator 490 may also control a speed at which second motor 400 rotates second blade assembly 445. For example, actuator 490 may include a knob, button, and/or any other suitable device that a user may use to adjust the speed of second blade assembly 445.

Figure 5A:
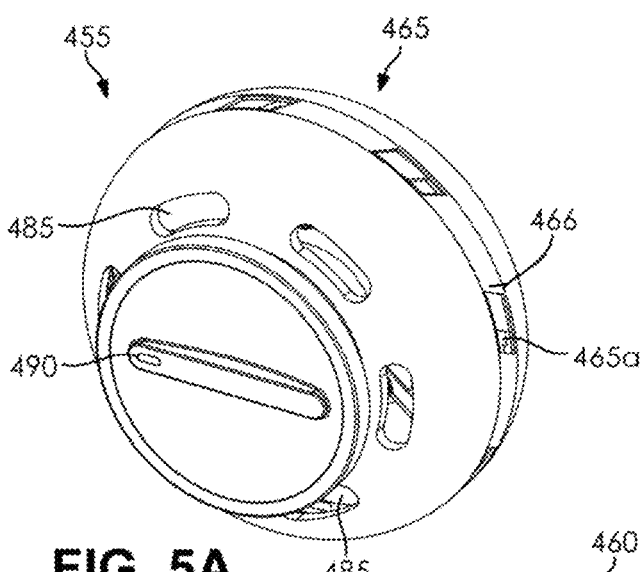
FIG. 5A illustrates a perspective view of an exemplary component of at least some exemplary embodiments of the present disclosure.
Figure 5B:
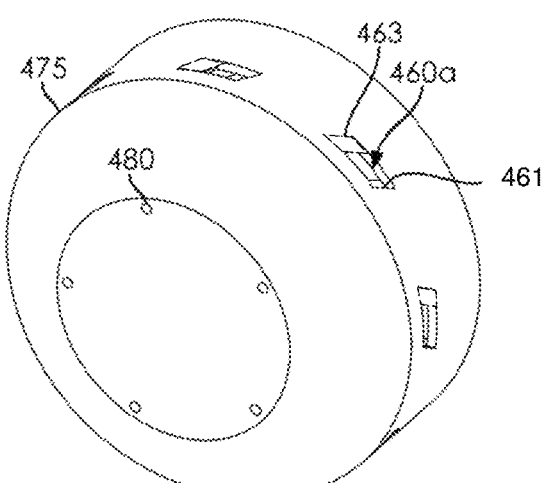
FIG. 5B illustrates a perspective view of an exemplary component of at least some exemplary embodiments of the present disclosure.
Figure 5C:
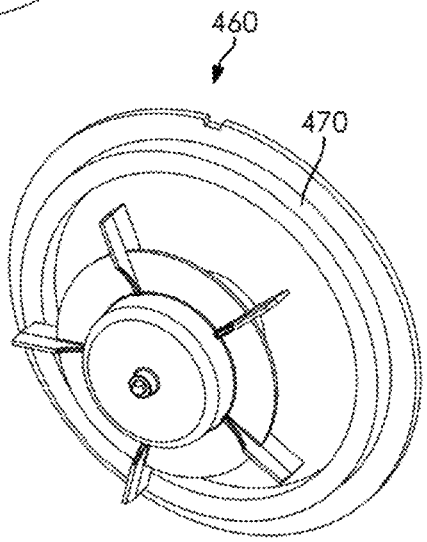
FIG. 5C illustrates a perspective view of an exemplary component of at least some exemplary embodiments of the present disclosure.

As illustrated in FIG. 5A, cover assembly 465 may include one or more (e.g., a plurality of) cover apertures 465a. As illustrated in FIG. 5B, base assembly 460 may include one or more (e.g., a plurality of) base apertures 460a. Base apertures 460a and cover apertures 465a may be elongated apertures. Base apertures 460a and cover apertures 465a may be aligned with each other and may partially or substantially entirely overlap when cover assembly 465 is received on base assembly 460. For example, a plurality of apertures through second housing 455 may be formed by at least a first portion of each of a plurality of base apertures 460a of base assembly 460 being respectively aligned with at least a second portion of each of a plurality of cover apertures 465a of cover assembly 465. Also for example, varying the size of a plurality apertures of second housing 455 may include rotating cover assembly 465 relative to base assembly 460 so that a respectively aligned portion of each of the plurality of cover apertures 465a and the plurality of base apertures 460a varies. Based on a rotation of cover assembly 465 relative to base assembly 460 for example as described above (e.g., guided by protrusions 480 being received in apertures 485), an amount by which cover apertures 465a overlap with base apertures 460a may vary. For example in a first position, cover apertures 465a may substantially entirely overlap with base apertures 460a so that a maximum opening through cover apertures 465a and base apertures 460a may be provided. For example in a second position, cover apertures 465a may be offset from base apertures 460a so that a minimum opening (e.g., or no opening) through cover apertures 465a and base apertures 460a may be provided (e.g., a wall portion 466 of cover assembly 465 adjacent to each cover aperture 465a may partially or substantially entirely cover and block base apertures 460a). Cover assembly 465 having cover apertures 465a may be rotated relative to base assembly 460 having base apertures 460a (e.g., via a user turning actuator 490 and/or based on actuator 490 operating based on control by controller 380) to any desired position between the first and second positions (e.g., and including the first and second positions). A size of openings through base apertures 460a and cover apertures 465a may thereby be adjusted in size to any desired size between a substantially fully open and a substantially fully closed position (e.g., to a quarter open, half open, three-quarters open, or any other desired fractional opening).

Figure 5D:
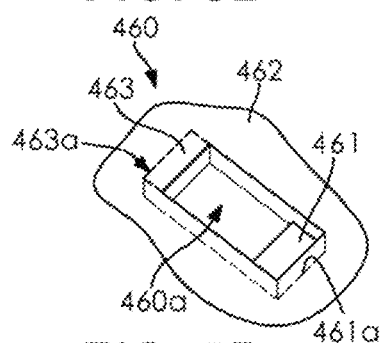
FIG. 5D illustrates a perspective view of an exemplary component of at least some exemplary embodiments of the present disclosure.

Recesses may be provided in wall members of cover assembly 465 and/or base assembly 460 in or adjacent to cover apertures 465a and/or base apertures 460a. For example as illustrated in FIG. 5D, base aperture 460a may be provided in a wall portion 462 of base assembly 460. A first step portion 461 forming a first recess 461a that may face toward an exterior of base assembly 460 (e.g., away from a second cavity 455a of second housing 455 and toward an interior of cover assembly 465) may be provided at a first side of base aperture 460a. A second step portion 463 forming a second recess 463a that may face toward an interior of base assembly 460 (e.g., toward second cavity 455a and away from an interior of cover assembly 465) may be provided at a second side of base aperture 460a. Second step portion 463 may channel air flow exiting second cavity 455a of second housing 455 against first recess 461a as air is forced from second cavity 455a into first cavity 342 (e.g., and then out of first cavity 342 through front member 360), thereby affecting the acoustics of apparatus 305. The acoustics of this airflow exiting second cavity 455a may be further varied based on adjustment of cover assembly 465 relative to base assembly 460 via actuator 490 to vary an opening size formed by base apertures 460a and cover apertures 465a. Similar step portions and recesses may be provided at cover assembly 465. The airflow generated by second fan assembly 335 and exiting second cavity 455a may be a second airflow (e.g., a second airflow 455b) that joins (e.g., mixes with) the airflow (e.g., a first airflow 340b) in first cavity 342 generated by first fan assembly 330.

Actuator 490 may also be adjusted to adjust a speed of second blade assembly 445 for example as described above. Adjusting the speed of second blade assembly 445 may additionally change the sound generated by second blade assembly 445 and thereby the acoustical characteristics of apparatus 305. Also for example, controller 380 may control second motor 400 to vary the speed of second blade assembly 445.

The sound generated by second fan assembly 335 may mix with the sound generated by first fan assembly 330. Actuator 490 may be adjusted (e.g., by a user and/or controller 380) to vary the opening sizes through base apertures 460a and cover apertures 465a and/or the speed of second blade assembly 445 to provide a desired total sound (e.g., a mixed, combined, or aggregate sound) of apparatus 305. The speed of second blade assembly 445 may also be varied based on controller 380 directly communicating with and controlling second motor 400.

Figure 7:
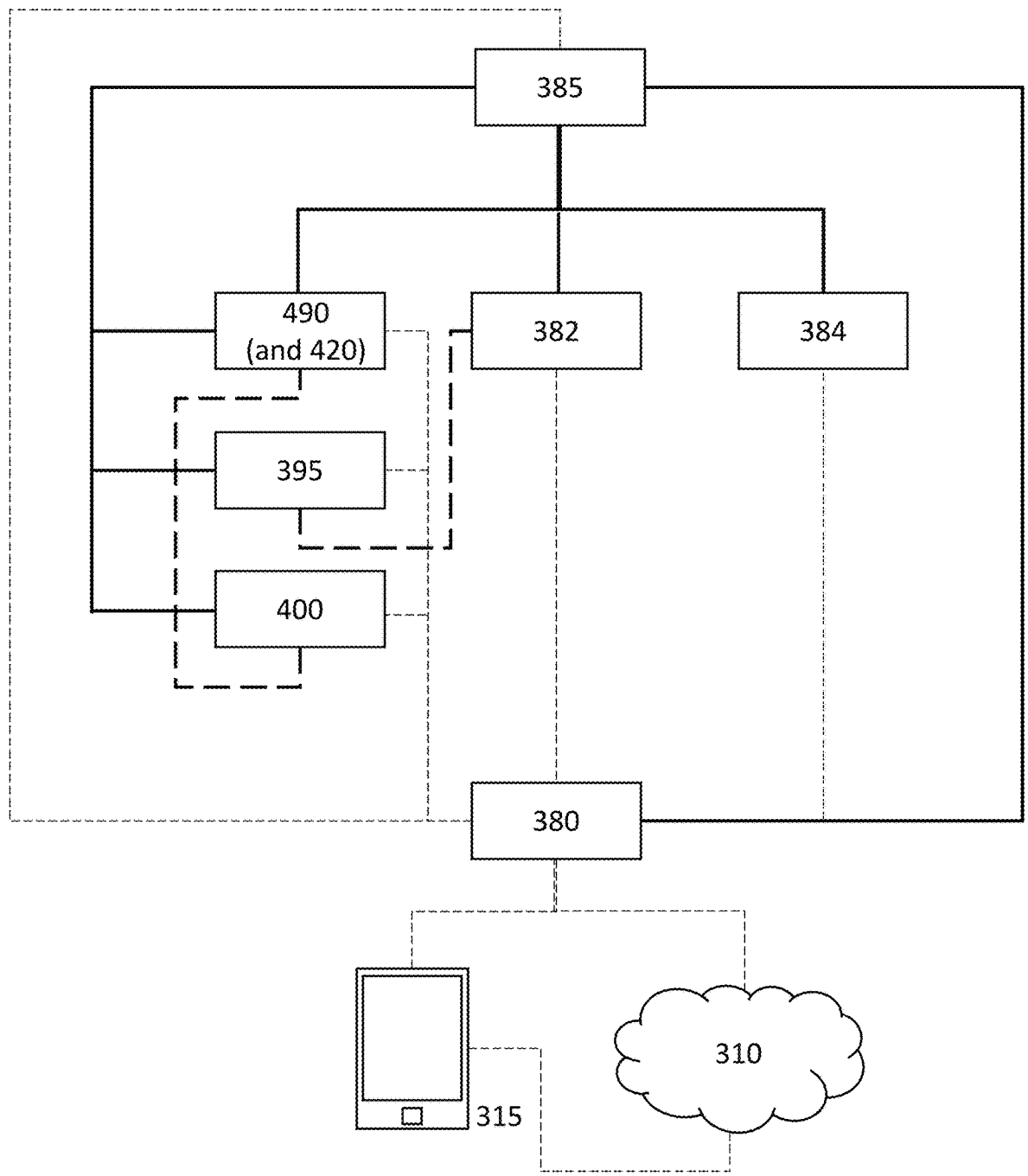
FIG. 7 illustrates a schematic view of at least some exemplary embodiments of the present disclosure.

As illustrated for example in FIG. 7, power device 385 may be electrically connected to and may power (e.g., provide electrical power to) controller 380, user interface 382, sensor 384, first motor 395, second motor 400, and actuator 490. Controller 380 may be communicatively coupled with, may exchange data with, and/or may control user interface 382, sensor 384, first motor 395, second motor 400, actuator 490, power device 385, network 310, and user device 315 via any suitable technique such as, for example, the exemplary disclosed techniques described herein. User interface 382 may be used (e.g., by a user) to control first motor 395. Actuator 490 may be used (e.g., by a user) to control second motor 400.

Figure 8:
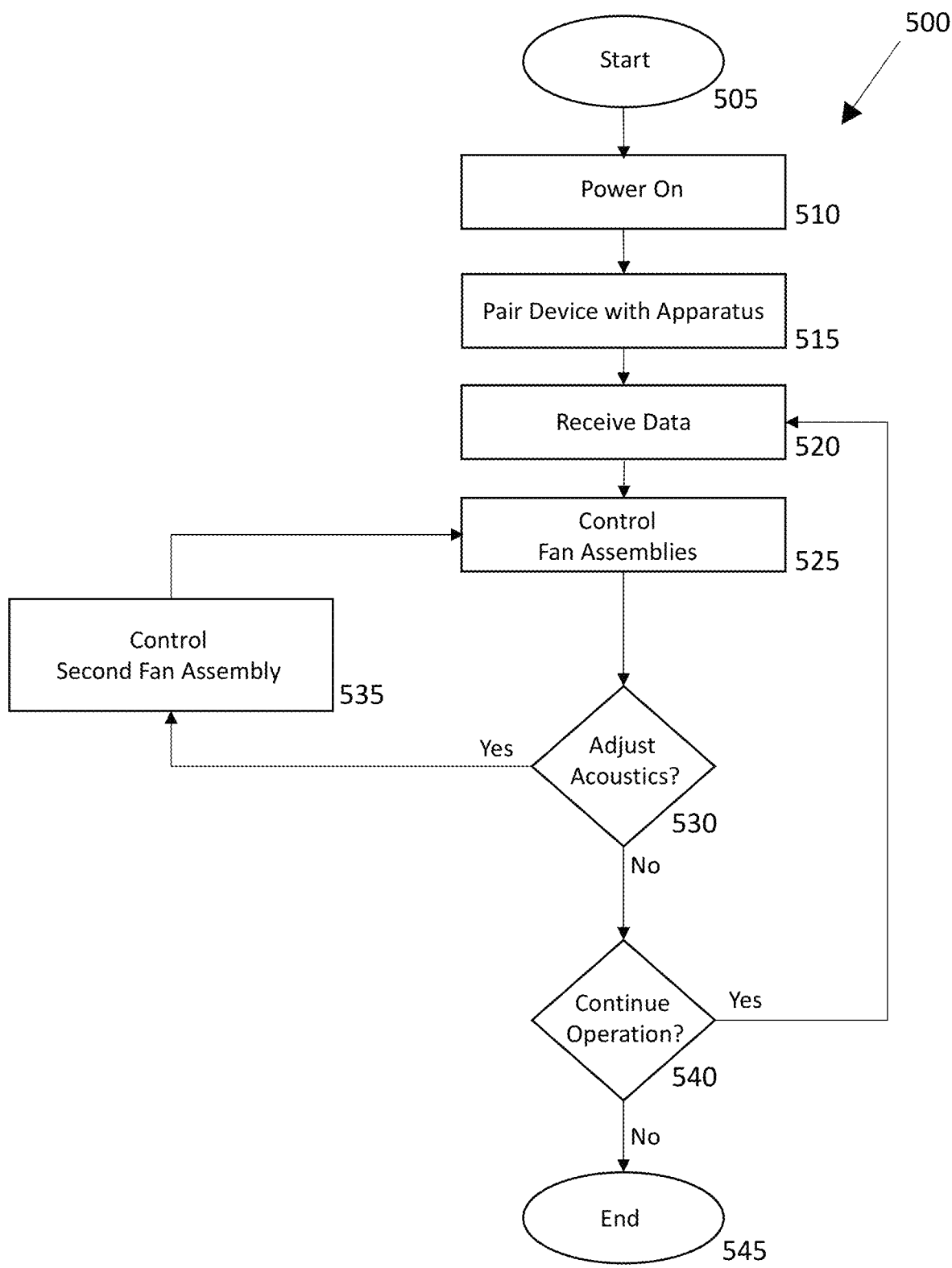
FIG. 8 illustrates an exemplary process of at least some exemplary embodiments of the present disclosure.
Figure 9:
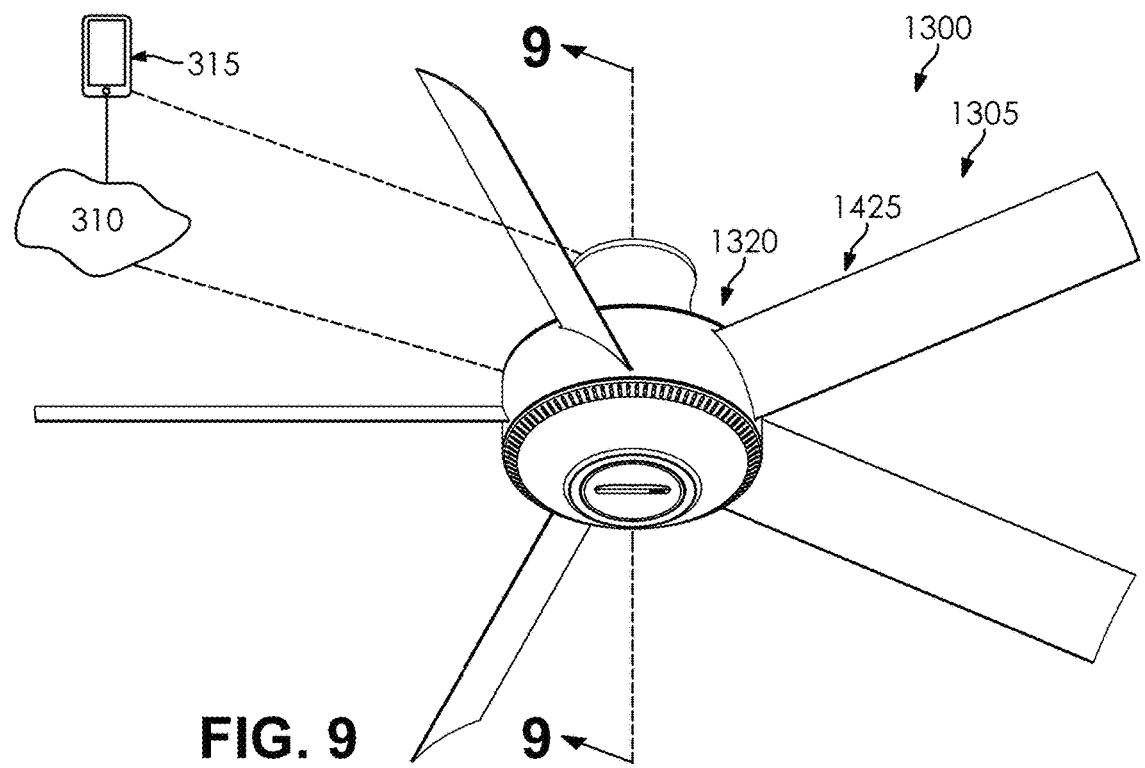
FIG. 9 illustrates a perspective view of at least some exemplary embodiments of the present disclosure.
Figure 10:
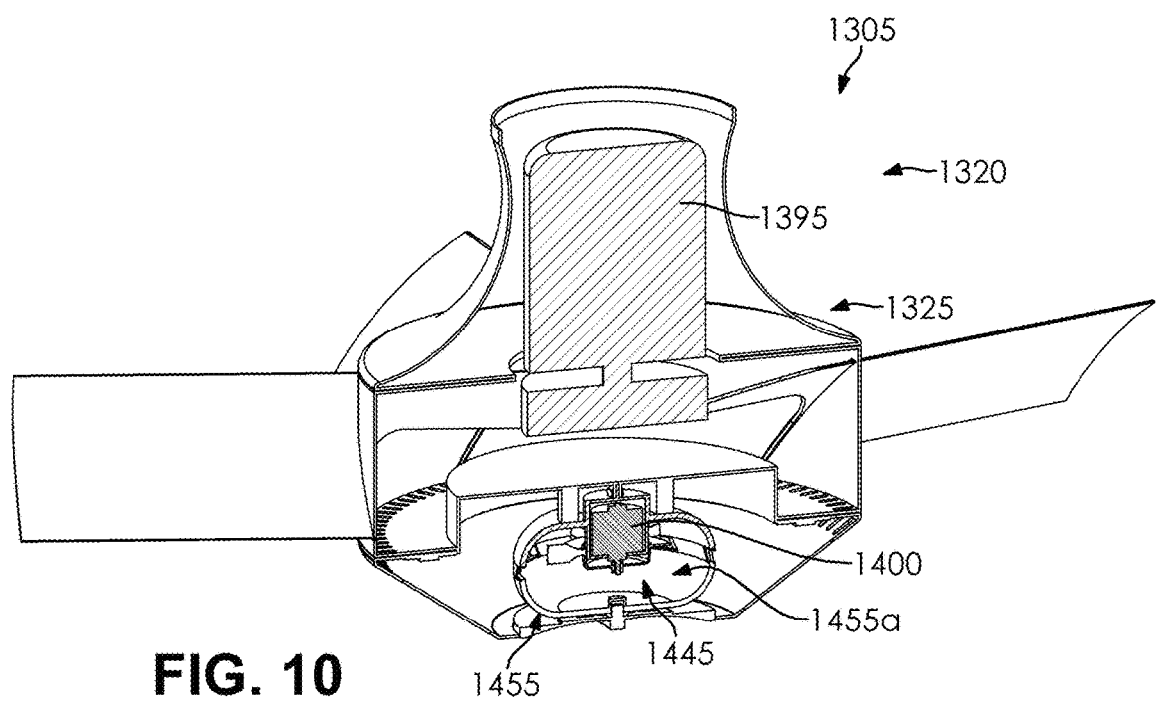
FIG. 10 illustrates a sectional view of at least some exemplary embodiments of the present disclosure.

FIG. 8 illustrates an exemplary operation or algorithm of exemplary disclosed system 300. Process 500 begins at step 505. At step 510, power device 385 may provide electrical power to controller 380, user interface 382, sensor 384, first motor 395, second motor 400, and/or actuator 490 (e.g., based on a user operating user interface 382 and/or actuator 490, apparatus 305 being plugged in for example to an outlet, and/or via input or control from network 310 and/or user device 315). For example, a user may control apparatus 305 using an API via user device 315 for example as described herein regarding the exemplary disclosed module. For example, a user may use an API to turn on or off and/or control a speed of first motor 395 and/or second motor 400 (e.g., and first blade assembly 425 and/or second blade assembly 445). The user may thereby use the API to adjust an airflow and/or acoustics of apparatus 305 for example as described herein. The API (e.g., and/or user interface 382 and/or actuator 490) may be used by a user to schedule a variable operation of apparatus 305 (e.g., to turn on and off and/or change fan speeds at programmed times).

At step 515, any suitable device or component (e.g., user device 315) may be paired with apparatus 305. The pairing may be performed using the exemplary disclosed module (e.g., via the exemplary disclosed API). The pairing may be performed based on a user using user interface 382. For example, the user may press (e.g., make a long-press) of a button of user interface 382 that may trigger a Bluetooth pairing mode of the exemplary disclosed module, which may allow apparatus 305 to be connected to the exemplary disclosed API (e.g., a companion app) and network 310

(e.g., a Wi-Fi network). Controller 380 may control display component 420 to turn on to indicate pairing is initiated and/or complete.

At step 520, controller 380 may receive input, data, and/or commands from any suitable component of system 300. For example, a user may enter input to instruct controller 380 to control an operation of apparatus 305 via user interface 382 and/or user device 315. Sensor 384 may transfer sensed data to controller 380 (e.g., data such as ambient temperature data and/or ambient noise data at a location of apparatus 305).

At step 525, controller 380 may control apparatus 305 based on the input, data, and/or commands received at step 520. For example, controller 380 may increase a speed of first motor 395 and first blade assembly 425 to increase airflow through apparatus 305 based on the input, data, and/or commands received at step 520. Controller 380 may decrease a speed of first motor 395 and first blade assembly 425 to decrease airflow through apparatus 305 based on the input, data, and/or commands received at step 520. Controller 380 may increase a speed of second motor 400 and second blade assembly 445 to vary acoustics (e.g., increase airflow from second cavity 455*a* to first cavity 342) based on the input, data, and/or commands received at step 520. Controller 380 may decrease a speed of second motor 400 and second blade assembly 445 to vary acoustics (e.g., decrease airflow from second cavity 455*a* to first cavity 342) based on the input, data, and/or commands received at step 520. A speed of first motor 395 and first blade assembly 425 may also be directly adjusted by a user (e.g., without an operation of controller 380) via manipulation of user interface 382. A speed of second motor 400 and second blade assembly 445 may also be directly adjusted by a user (e.g., without an operation of controller 380) via manipulation of actuator 490.

Controller 380 may control actuator 490 to rotate cover assembly 465 having cover apertures 465*a* relative to base assembly 460 having base apertures 460*a* to increase a size of openings through base apertures 460*a* and cover apertures 465*a* based on the input, data, and/or commands received at step 520 to vary acoustics (e.g., increase airflow from second cavity 455*a* to first cavity 342). Controller 380 may control actuator 490 to rotate cover assembly 465 having cover apertures 465*a* relative to base assembly 460 having base apertures 460*a* to decrease a size of openings through base apertures 460*a* and cover apertures 465*a* based on the input, data, and/or commands received at step 520 to vary acoustics (e.g., decrease airflow from second cavity 455*a* to first cavity 342). A user may also directly manipulate and adjust actuator 490 (e.g., without an operation of controller 380) to rotate cover assembly 465 having cover apertures 465*a* relative to base assembly 460 having base apertures 460*a* to increase or decrease a size of openings through base apertures 460*a* and cover apertures 465*a*.

First fan assembly 330 and second fan assembly 335 may be controlled independently of each other based on the exemplary disclosed adjustments described above. First fan assembly 330 and second fan assembly 335 may be controlled independently of each other based on direct manipulation by a user and/or controller 380.

Controller 380 may control apparatus 305 based on an operation of the exemplary disclosed module. For example, controller 380 may control apparatus 305 to perform the exemplary disclosed adjustments described above using any suitable predetermined criteria or algorithms based for example on a predetermined time schedule, sensed temperature provided by sensor 384, sensed noise or sound provided by sensor 384, and/or any other desired criteria. For example, controller 380 may increase or decrease a primary airflow through apparatus 305 (e.g., via controlling first motor 395) and/or increase or decrease airflow from second cavity 455*a* to first cavity 342 (e.g., via controlling second motor 400) at predetermined times of the day (e.g., late night or early morning) and/or when the sensed temperature (e.g., or noise) transferred from sensor 384 is greater or lower than one or more threshold temperatures (e.g., or noise levels). For example, controller 380 may operate to increase a speed of first motor 395 to increase airflow generated by first blade assembly 425 when a sensed temperature increases above a threshold temperature. Controller 380 may control apparatus 305 to make the exemplary disclosed adjustments described above based on any sensed parameter (e.g., temperature, sound level, and/or any other desired parameter) increasing or decreasing over or under any predetermined thresholds (e.g., or falling inside or outside of predetermined data ranges).

In at least some exemplary embodiments, controller 380 may control (e.g., or a user may adjust via actuator 490) apparatus 305 to operate in a "Day Mode" or a "Night Mode." In the "Day Mode," apparatus 305 may make a normal operating fan sound (e.g., a fan sound of a volume that users may expect from a fan used during the daytime or waking hours). In the "Night Mode," apparatus 305 may make relatively lower frequency tones (e.g., similar to "white noise" or "pink noise" for background acoustics for sleeping and noise masking) as compared to the "Day Mode."

Controller 380 may also control apparatus 305 to display any desired data to a user. For example, controller 380 may transfer output (e.g., a fan speed or operating level of first blade assembly 425 and/or second blade assembly 445, a sensed parameter of sensor 384, and/or any other desired data) to an API viewed by a user via user device 315 and/or network 310, user interface 382, display component 420, and/or any other suitable display.

At step 530, controller 380 may determine whether or not the acoustics of apparatus 305 should be adjusted based for example on user input (e.g., or user manipulation) and/or an algorithm or other suitable predetermined criteria for example as described above. If the acoustics are to be adjusted, system 300 may proceed to step 535, at which an operation of second motor 400 and second blade assembly 445 may be adjusted for example as described above at step 525. System 535 may then return to step 525. System 300 may proceed iteratively through steps 525, 530, and 535 as desired. If acoustics are not to be adjusted at step 530, system 300 may proceed to step 540.

At step 540, controller 380 may determine whether or not an operation of apparatus 305 should be continued based for example on user input (e.g., or user manipulation) and/or an algorithm or other suitable predetermined criteria for example as described above. If operation is to be continued, process 500 returns to step 520. If operation is to stop, process 500 ends at step 545.

In at least some exemplary embodiments, a fan hub of a fan or blower may be repurposed (e.g., to include second fan assembly 335) to control (e.g., improve) fan acoustics without a loss of airflow through the fan or blower (e.g., apparatus 305). System 300 may operate to alter the fan acoustics sound spectrum without any deleterious effects to the airflow or form factor of the fan or blower (e.g., apparatus 305). For example, a fan hub region may be repurposed with a secondary fan (e.g., second fan assembly 335) that may spin within an acoustic enclosure (e.g., second housing 455) to alter the fan acoustics (e.g., of apparatus 305). The purpose of the secondary fan (e.g., second fan assembly 335) may be for sound alteration, while the purpose of the primary fan (e.g., first fan assembly 330) may be for airflow generation. The placement of the secondary fan (e.g., second fan assembly 335) for sound alteration in the fan hub region may allow for appropriate or suitable integration with a baseline sound from the primary fan (e.g., first fan assembly 330). The acoustic enclosure (e.g., second housing 455) may include side outlet sound vents (e.g., formed by cover apertures 465a and base apertures 460a), which may allow the sound from the secondary fan (e.g., second fan assembly 335) to exit and mix properly with the sound from the primary fan (e.g., first fan assembly 330), thereby creating a unified sound for the user. The secondary fan (e.g., second fan assembly 335) may provide for sound adjustment of apparatus while allowing a size of and airflow generated by the primary fan (e.g., first fan assembly 330) to remain substantially unchanged.

FIGS. 9-12 illustrate another exemplary embodiment of the exemplary disclosed system, apparatus, and method. System 1300 may include an apparatus 1305 that may communicate with network 310 and/or user device 315 similarly to apparatus 305. Apparatus 1305 may include a structural assembly 1320 that may be formed from materials similar to structural assembly 320, and may be configured as a ceiling fan having a first cavity 1342.

Apparatus 1305 may include a power control assembly 1325 that may be similar to power control assembly 325. For example, power control assembly 1325 may include a first motor 1395, which may be similar to first motor 395, and a second motor 1400 that may be similar to second motor 400. First motor 1395 may be controlled by a controller 1380, which may be similar to and operate similarly to controller 380, to drive a first blade assembly 1425 that may be formed from materials similar to first blade assembly 425 and that may be for example a ceiling fan. Second motor 1400 may be controlled by controller 1380 to drive a second blade assembly 1445 that may be similar to second blade assembly 445.

Second blade assembly 1445 may be disposed in a second housing 1455 that may be similar to second housing 455. Second housing 1455 may include a base assembly 1460 including a plurality of base apertures 1460a that may be similar to base assembly 460 including base apertures 460a. Second housing 1455 may also include a cover assembly 1465 including a plurality of cover apertures 1465a that may be similar to cover assembly 465 including cover apertures 465a. Second housing 1455 may form a second cavity 1455a that may be similar to second cavity 455a. Controller 1380 (e.g., and/or an actuator manipulated by a user similar to actuator 490) may control an amount of airflow directed from second cavity 1455a to first cavity 1342 similarly to as described above regarding apparatus 305. Structural assembly 1320 may include a plurality of sound outlets 1320a (e.g., apertures) for sound generated by second blade assembly 1445 disposed in second housing 1455 to be released or emitted to a space (e.g., a room) in which apparatus 1305 is located. Controller 1380 (and/or direct manipulation by a user) may control apparatus 1305 similarly to as described above regarding apparatus 305. System 1300 may operate similarly to system 300 for example as described above regarding process 500.

Figure 11:
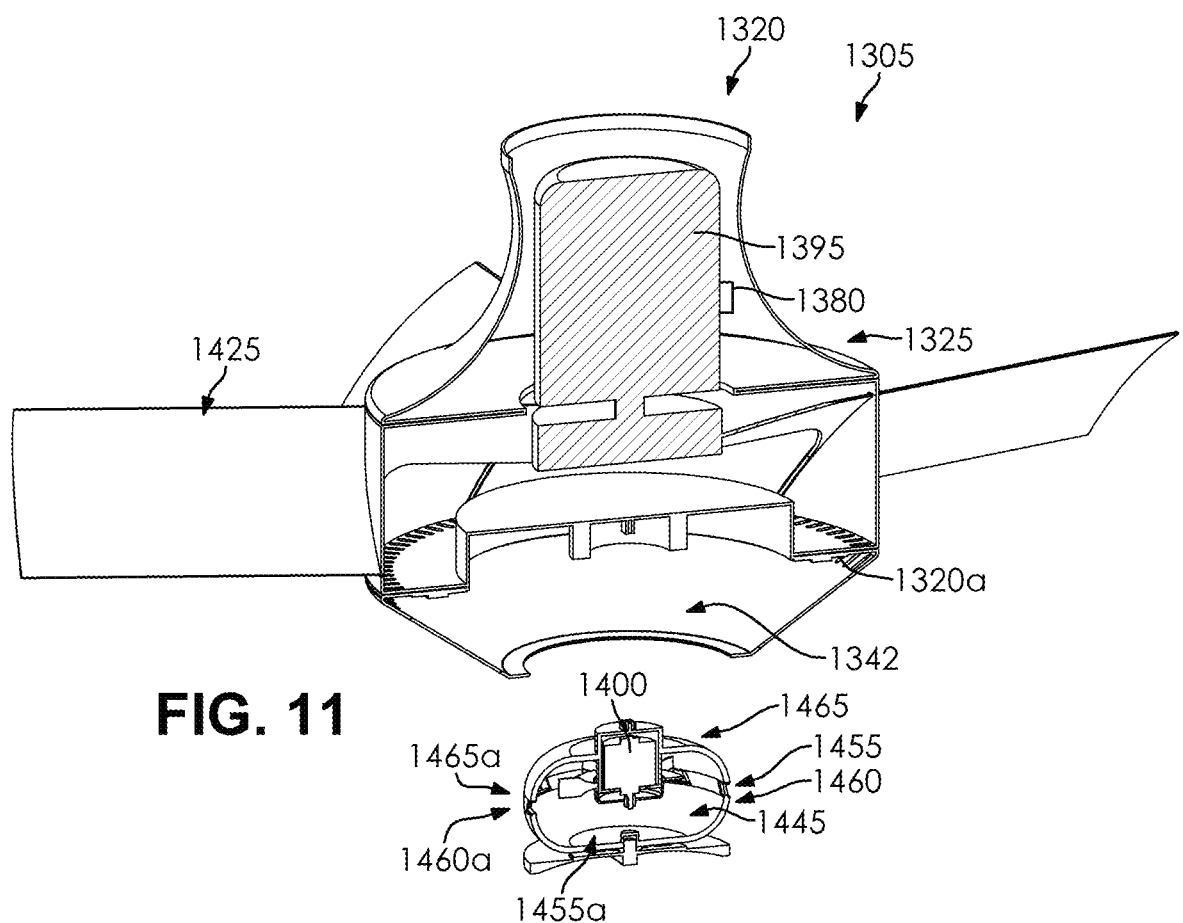
FIG. 11 illustrates a perspective, interior view of at least some exemplary embodiments of the present disclosure.
Figure 12:
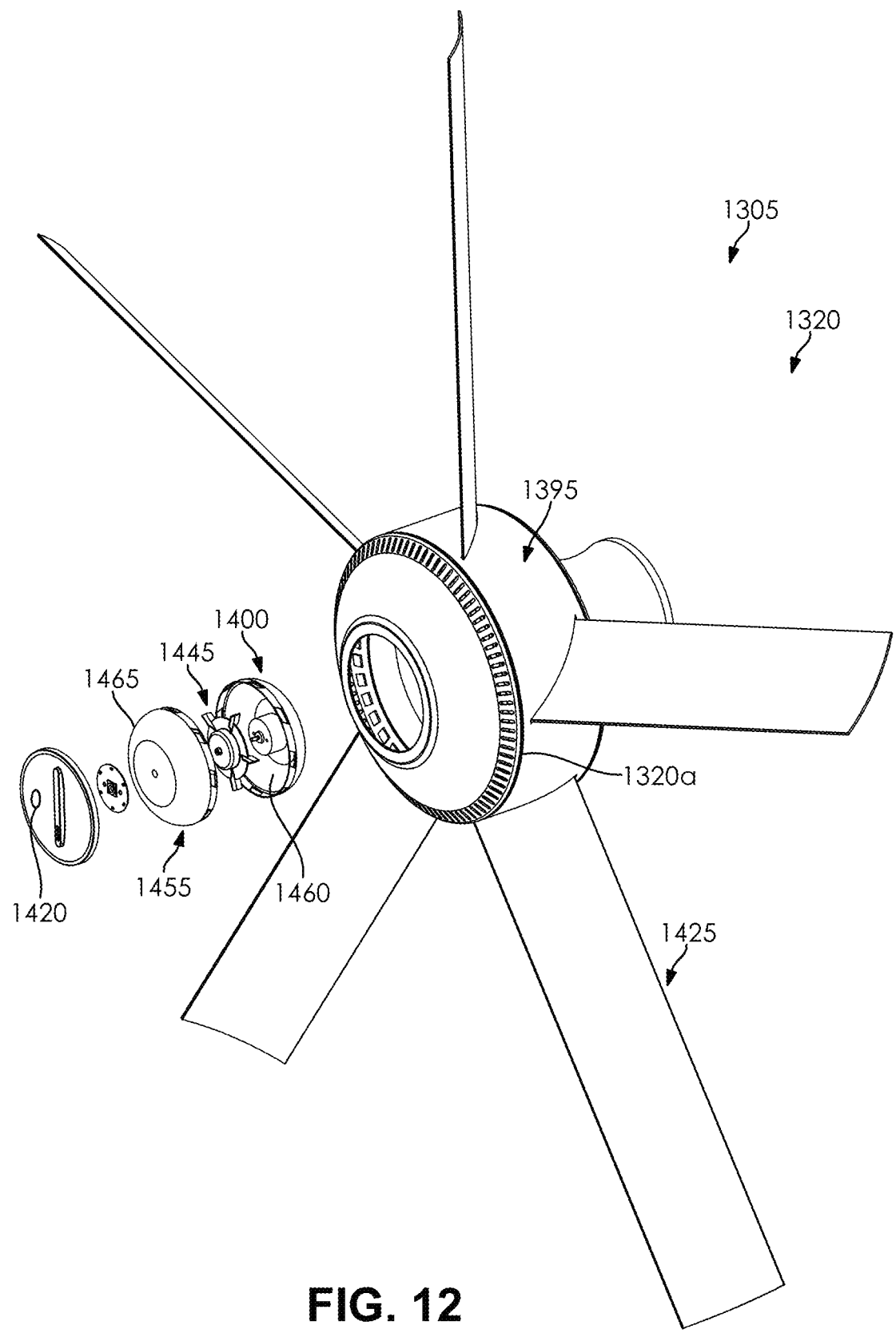
FIG. 12 illustrates a perspective, exploded view of at least some exemplary embodiments of the present disclosure.
Figure 17:
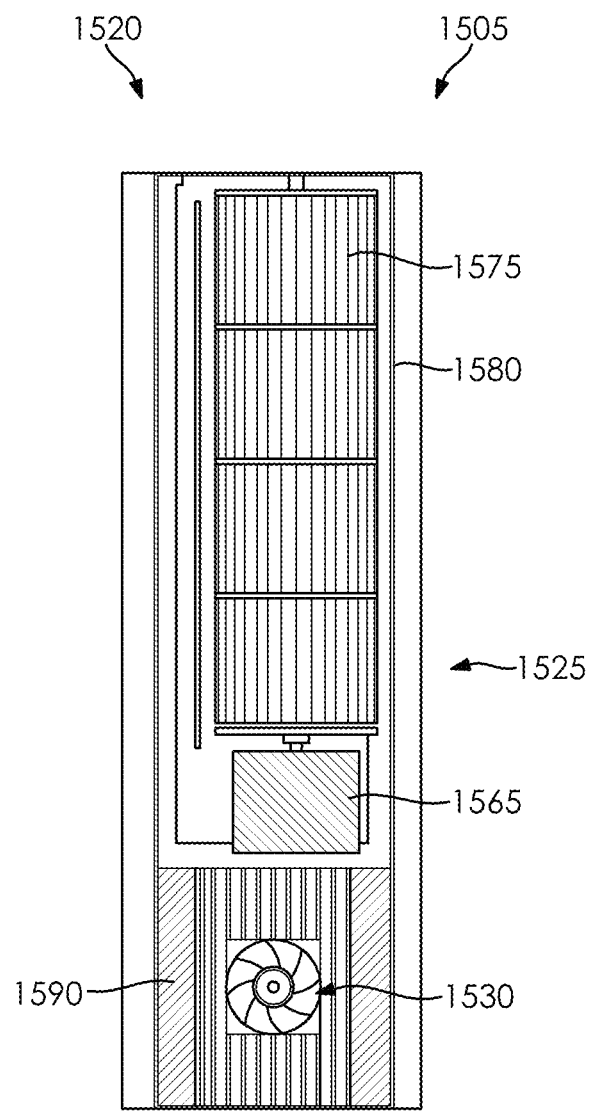
FIG. 17 illustrates a sectional view of at least some exemplary embodiments of the present disclosure.

Second housing 1455 may be a modular assembly that may be removably received in first cavity 1342. For example as illustrated in FIGS. 11 and 12, a front assembly of apparatus 1305 may be removed so that second housing 1455 may be detached and removably attached in first cavity 1342. Second housing 1455 may be removably attachable to structural assembly 1320 via any suitable technique such as mechanical fasteners, threadable portions that may be screwed or unscrewed, hook and loop fasteners, or any other suitable technique. Based on second housing 1455 being a removably attachable, modular assembly, second housing 1455 may be removed and/or replaced without involving replacing and/or rewiring all of apparatus 1305, for example when a sound issue (e.g., unsuitable sound) may occur relating to second housing 1455. In at least some exemplary embodiments, second housing 455 of apparatus 305 may also similarly be a removably attachable, modular assembly.

Apparatus 1305 may include a display component 1420 for example as illustrated in FIG. 12 that may be similar to display component 420. For example, display component 1420 may be an LED light. Controller 1380 may control display component 1420 similarly to the control of display component 420 by controller 380 described above. Controller 1380 may control display component 1420 to change a display (e.g., change a lighting color to display output of a temperature for example as provided by a sensor similar to sensor 384) depending on a time of day or any other suitable criteria. For example, during daytime hours, display component 1420 may display a white color (e.g., high temperatures). As nightfall approaches, display component 1420 may emit a different color such as orange as the sensed ambient temperature decreases, which may help a user prepare for sleep.

FIGS. 13-17 illustrate another exemplary embodiment of the exemplary disclosed system, apparatus, and method. System 1500 may include an apparatus 1505 that may communicate with network 310 and/or user device 315 similarly to apparatus 305.

Apparatus 1505 may be a cold storage device. For example, apparatus 1505 may be a cold storage fan or blower that may operate in a cooling mode and/or a heating mode. Apparatus 1505 may include a structural assembly 1520, a fan assembly 1525, a cooler assembly 1530, a storage reservoir 1535, a heat pump 1540, an evaporator 1545, and a heater core 1550. Structural assembly 1520 may structurally support fan assembly 1525, cooler assembly 1530, storage reservoir 1535, heat pump 1540, evaporator 1545, and heater core 1550. Cooler assembly 1530, storage reservoir 1535, fan assembly 1525, heat pump 1540, and evaporator 1545 may operate together in the cooling mode for example as described herein. Fan assembly 1525 and heater core 1550 may operate together in the heating mode for example as described herein. The exemplary disclosed components of apparatus 1505 may be powered by any suitable system such as for example similarly to as described above regarding power control assembly 325. Apparatus 1505 may also include a controller 1508 that may be similar to and operate similarly as controller 380 described above. Apparatus 1505 may also include on or more sensors similar to for example sensor 384 described above.

Structural assembly 1520 may be formed from materials similar to structural assembly 320 and may be an assembly of members attached together via any suitable technique such as mechanical fasteners, adhesive, welding, and/or any other suitable attachment technique (e.g., or may be an integral member). Structural assembly 1520 may include cavities configured to receive the exemplary disclosed supported components, which may be attached to and/or supported by structural assembly 1520 by any suitable technique such as, for example, mechanical fasteners, adhesive, press-fit attachment, and/or any other suitable attachment technique. Structural assembly 1520 may include a plurality of inlet apertures 1555 and a plurality of outlet apertures 1560. For example, the plurality of inlet apertures 1555 may be formed as part of a grill, a mesh, or a vent disposed at a rear portion of structural assembly 1520, and the plurality of outlet apertures 1560 may be formed as part of a grill, a mesh, or a vent disposed at a front portion of structural assembly 1520. An airflow may be generated through apparatus 1505, from the plurality of inlet apertures 1555 to the plurality of outlet apertures 1560, based on an operation of fan assembly 1525.

Fan assembly 1525 may be any suitable fan or blower assembly for generating an airflow through apparatus 1505 (e.g., from the plurality of inlet apertures 1555 to the plurality of outlet apertures 1560). Fan assembly 1525 may include a motor 1565 that may be similar to first motor 395 and second motor 400, and a shaft 1570 that may be similar to first shaft 405 and second shaft 410. Shaft 1570 may be attached to and may drive (e.g., rotatably drive) a fan 1575 that may be disposed in a fan housing 1580.

Fan 1575 disposed in fan housing 1580 may be any suitable fan or blower for generating an airflow through apparatus 1505 such as, for example, a centrifugal fan. Fan 1575 disposed in fan housing 1580 may also be similar to first fan assembly 330 or second fan assembly 335. In at least some exemplary embodiments, fan 1575 disposed in fan housing 1580 may form a ducted fan. Fan 1575 may be for example an impeller that may be rotatably supported in fan housing 1580. Fan housing 1580 may for example be formed as a mesh housing or cage such as a cylindrical mesh housing (e.g., formed from a structural mesh such as a mesh of metal, plastic, or composite members). In at least some exemplary embodiments, fan 1575 disposed in fan housing 1580 may be a cage fan (e.g., a squirrel cage fan). Based on a rotation of fan 1575 in fan housing 1580 driven by motor 1565 via shaft 1570, fan 1575 may generate a flow of air into apparatus 1505 via inlet apertures 1555 and then out through outlet apertures 1560.

Cooler assembly 1530 may be any suitable assembly for cooling material disposed in storage reservoir 1535. Cooler assembly 1530 may be any suitable electric cooler, open or closed loop evaporative cooling system, liquid-to-liquid cooling system, or any other suitable system for cooling material disposed in storage reservoir 1535. In at least some exemplary embodiments, cooler assembly 1535 may be a thermoelectric cooler and/or heater. For example, cooler assembly 1535 may be a Peltier cooler or heater. Cooler assembly 1530 may be electrically powered (for example similarly to as described above regarding power control assembly 325) to reduce a temperature of material disposed in storage reservoir 1535. For example, cooler assembly 1530 may charge storage reservoir 1535 with "cold energy." Controller 1508 may operate to control cooler assembly 1530 similarly to the control operations of controller 380 described above.

Storage reservoir 1535 may be any suitable reservoir for storing a material 1585 that may be selectively cooled (e.g., or heated) by cooler assembly 1530. Storage reservoir 1535 may be a cold storage battery. Storage reservoir 1535 may be formed from any suitable material such as plastic, composite material, metal, and/or any other suitable material for substantially water-tight (e.g., water-tight) storage of material 1585. Storage reservoir 1535 may be partially or substantially entirely surrounded by insulator material 1590, which may be any suitable insulator material such as natural fiber material, polystyrene, polyurethane, cellulose, fiberglass, and/or any other suitable insulator material. Material 1585 may be any suitable high-heat capacity fluid such as, for example, water. Material 1585 may also be a relatively high-heat capacity solid material such as steel or iron. Based on cooling via cooler assembly 1530, a temperature of material 1585 may be reduced as storage reservoir 1535 is charged with cold energy (e.g., and/or material 1585 that may be water may experience a phase change such as being frozen partially or substantially entirely from water to ice). In at least some exemplary embodiments, storage reservoir 1535 may be a water tank.

Heat pump 1540 may be any suitable device for extracting "cold energy" from material 1585 disposed in storage reservoir 1535 and transferring (e.g., routing) the thermal energy (e.g., the "cold energy") to evaporator 1545. Heat pump 1540 may be a water source heat pump. Heat pump 1540 may be a chiller. In at least some exemplary embodiments, heat pump 1540 may be any suitable vapor-compression device. Controller 1508 may operate to control heat pump 1540 similarly to the control operations of controller 380 described above.

Evaporator 1545 may be any suitable device through which the exemplary disclosed airflow (e.g., a flow of air entering inlet apertures 1555 and moving through apparatus 1505) generated by fan assembly 1525 may be moved through apparatus 1505 to provide a chilled or air-conditioned flow out through evaporator 1545 and outlet apertures 1560. Evaporator 1545 may thereby introduce the "cold energy" transferred from heat pump 1540 to the exemplary disclosed airflow to provide the chilled or air-conditioned flow out of apparatus 1505 through outlet apertures 1560 (e.g., to a room such as a bedroom or any other location of apparatus 1505). Evaporator 1545 may be a coiled evaporator, a finned evaporator, and/or any other suitable type of evaporator for cooling the exemplary disclosed airflow generated by fan assembly 1525. Controller 1508 may operate to control evaporator 1545 similarly to the control operations of controller 380 described above.

Heater core 1550 may be any suitable device through which the exemplary disclosed airflow (e.g., a flow of air entering inlet apertures 1555 and moving through apparatus 1505) generated by fan assembly 1525 may be moved through apparatus 1505 to provide a heated flow out through outlet apertures 1560. Heater core 1550 may be an electrically resistive heating device. Heater core 1550 may be a coil heating device. Heater core 1550 may include heating elements formed from any suitable material such as metal, ceramic, or any other suitable material. Controller 1508 may operate to control heater core 1550 similarly to the control operations of controller 380 described above.

Apparatus 1505 may be a stand-alone device for example as illustrated in FIGS. 13 and 14. In at least some exemplary embodiments, apparatus 1505 may be integrated into a cooling bed (e.g., or a cooling chair, cooling couch, and/or any other furniture component for providing cooling).

Figure 18:
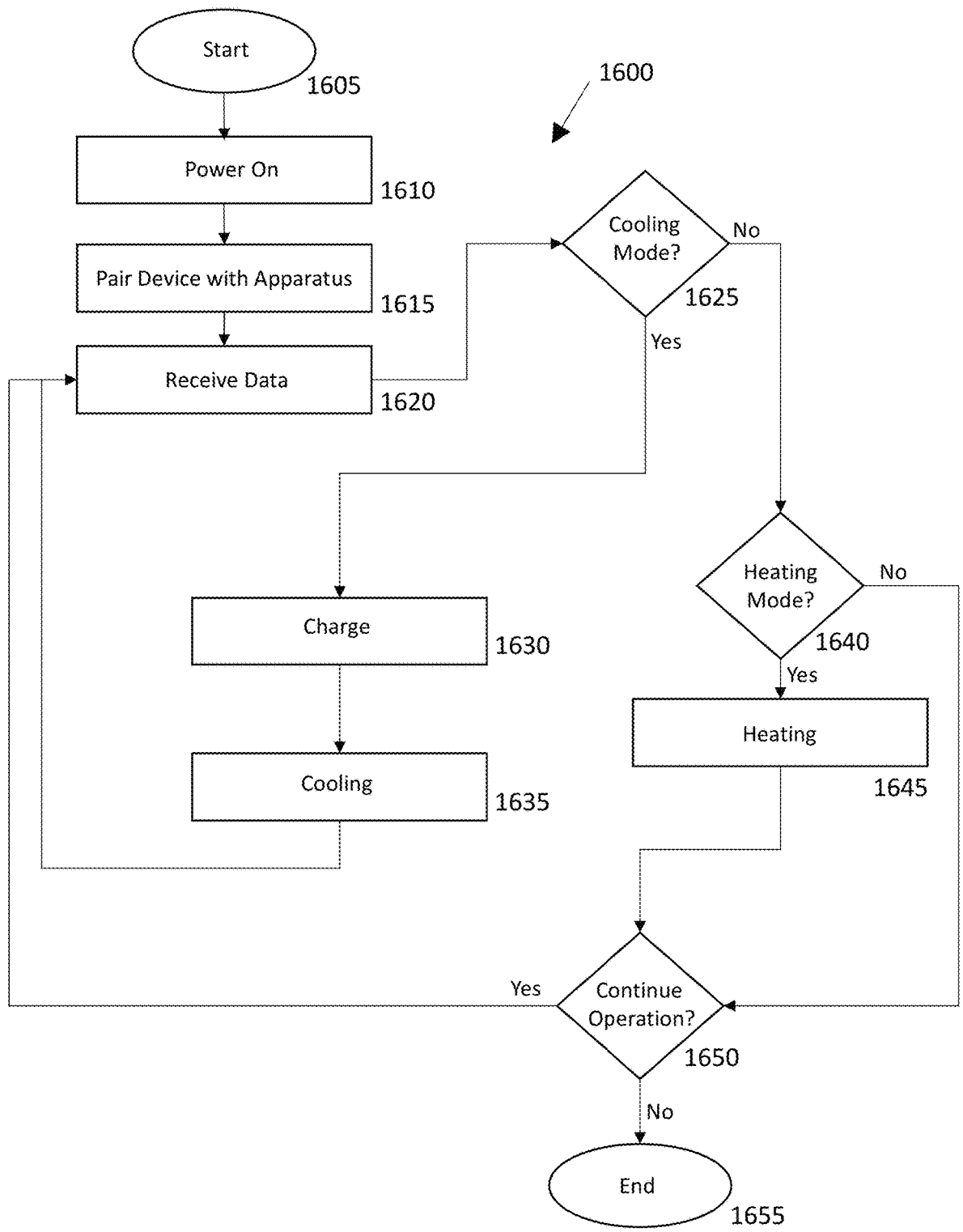
FIG. 18 illustrates an exemplary process of at least some exemplary embodiments of the present disclosure.

FIG. 18 illustrates an exemplary operation or algorithm of exemplary disclosed system 1500. Process 1600 begins at step 1605. Step 1610 may be a power-on step that may be similar to step 510 described above. Step 1615 may be a pairing step that may be similar step 515 described above. Step 1620 may be a data receiving step that may be similar to step 520 described above. In at least some exemplary embodiments and similar to the exemplary disclosed components and operation of system 300, system 1500 may have any suitable communication capability (e.g., Bluetooth and Wi-Fi capability) so that apparatus 1505 may connect to a companion app for remote control operation (e.g., via user device 315). System 1500 may thereby operate using a predetermined schedule (e.g., a programmed time schedule)

and/or predetermined temperature thresholds for example similar to as described above regarding system 300. Further for example, a given apparatus 1505 may connect to other apparatuses 1505 (e.g., and/or apparatuses 300 and/or 1300) and/or Internet of Things devices (e.g., a smart thermostat) so that apparatus 1505 (e.g., and/or apparatus 300 and/or apparatus 1305) may deliver a desired (e.g., optimal) temperature for a given room or location at desired (e.g., minimum) energy consumption.

At step 1625, controller 1508 may determine whether or not a cooling mode should be initiated based for example on user input (e.g., or user manipulation) and/or an algorithm or other suitable predetermined criteria for example similar to as described above regarding process 500. If a cooling mode is to be initiated, system 1500 proceeds to step 1630. Controller 1508 may control process 1600 similarly for example to the control of process 500 by controller 380.

At step 1630, cooler assembly 1530 may charge storage reservoir 1535 with "cold energy." Step 1630 may occur during non-sleeping hours (e.g., for example when a user is not sleeping in a bedroom or other location in which apparatus 1505 is located) or other desired time periods such as prior to a time when apparatus 1505 is to be used to cool an area. Cooler assembly 1530 may operate to cool (e.g., reduce a temperature) and/or freeze material 1585 disposed in storage reservoir 1535.

At step 1635, cooler assembly 1530 may be turned off. Heat pump 1540 may extract "cold energy" from material 1585 disposed in storage reservoir 1535 and transfer the thermal energy (e.g., the "cold energy") to evaporator 1545. Evaporator 1545 may introduce the "cold energy" transferred from heat pump 1540 to the exemplary disclosed airflow generated by fan assembly 1525 to provide chilled or air-conditioned flow out of apparatus 1505 through outlet apertures 1560. Step 1635 may occur during sleeping hours such as, for example, a full night of sleep of a user in a location such as a bedroom in which apparatus 1505 is located. Cooler assembly 1530 (e.g., and heater core 1550) may remain turned off during step 1635 so that substantially no residual heat is vented out of apparatus 1505 and into a location (e.g., a room such as a bedroom) in which apparatus 1505 is located. Apparatus 1505 may thereby provide a net heat decrease to a location such as a room (e.g., a bedroom) during step 1635, which may encompass a time period in which cooling is desired such as a 6-12 hour or 8-10 hour time period (e.g., a sleeping period of the user or a work period of a user). System 1500 may return to step 1620.

If system 1500 determines at step 1625 that a cooling mode is not to be initiated, system 1500 proceeds to step 1640. At step 1640, controller 1508 may determine whether or not a heating mode should be initiated similar to as described above regarding the cooling mode at step 1625. If a heating mode is to be initiated, system 1500 proceeds to step 1645.

At step 1645, fan assembly 1525 generates the exemplary disclosed airflow through apparatus 1505 from inlet apertures 1555 to outlet apertures 1560. The exemplary disclosed airflow passes through heater core 1550, which may operate to heat the airflow so that a heated flow may be provided through outlet apertures 1560. Apparatus 1505 may thereby act as a heater during a desired time period of step 1645. Cooler assembly 1530, heat pump 1540, and evaporator 1545 may remain turned off during step 1645. Alternatively for example, cooler assembly 1530 may operate to charge storage reservoir 1535 with cold energy (e.g., to cool material 1585) during step 1645. Fan assembly 1525 and heater core 1550 may be powered and may operate for any desired time period. When heating is turned off (e.g., based on control similar to as described at step 1625), system 1500 proceeds to step 1650.

At step 1650, controller 1508 may determine whether or not an operation of system 1500 should be continued similar to as described above regarding step 1625. If operation is to be continued, system 1500 returns to step 1620. The exemplary disclosed steps of process 1600 may then be repeated for as many iterations as desired. If operation is not to be continued, process 1600 ends at step 1655.

In at least some exemplary embodiments, process 1600 may provide a method for charging and storing "cold energy" during non-sleeping hours (e.g., at step 1630 and/or step 1645), which may then be released during sleeping hours (e.g., at step 1635) for a net reduction of ambient temperatures. For example, apparatus 1505 may operate to store up "cold energy" during non-sleeping hours and then discharge that "cold energy" when desired (e.g., during the night to keep a bedroom cool) without venting residual heat energy (e.g., during the night in the bedroom). Also for example, apparatus 1505 may operate to store up "cold energy" during non-work hours and then discharge that "cold energy" when desired (e.g., during work hours to keep a cubicle or office cool) without venting residual heat energy (e.g., during work hours). In at least some exemplary embodiments, step 1630 may occur during a non-sleeping time period (e.g., of about 16 hours) and time period 1635 may occur during a sleeping time period (e.g., of about 8 hours), and steps 1630 and 1635 may be iteratively repeated for example as described above and as illustrated in FIG. 18.

In at least some exemplary embodiments and for example returning to FIGS. 1-12, the exemplary disclosed apparatus may include a first housing having a first cavity (e.g., first cavity 342 or first cavity 1342), a second housing disposed in the first housing and including a second cavity (e.g., second cavity 455a or second cavity 1455a) and at least one aperture, a first fan assembly configured to generate a first airflow through the first housing, and a second fan assembly configured to generate a second airflow from the second cavity to the first cavity via the at least one aperture. The first fan assembly may include a first fan that rotates about a same axis as a second fan of the second fan assembly, the first fan rotating in a first rotational direction that is opposite to a second rotational direction of the second fan. The second fan assembly may include a second fan having a second diameter that may be disposed within the second cavity of the second housing. The first fan assembly may include a first fan having a first diameter that may be greater than the second diameter. The first fan assembly may include a first fan driven by a first shaft and the second fan assembly may include a second fan driven by a second shaft, the first shaft and the second shaft being concentric shafts. The second housing may be one of a table fan housing supported by a stand or a ceiling fan housing supporting the second fan assembly that is a ceiling fan assembly. A first step portion forming a first recess that faces away from the second cavity may be disposed in the at least one aperture. A second step portion forming a second recess that faces toward the second cavity may be disposed in the at least one aperture. The second housing may include a base assembly and a cover assembly that is rotatably attached to the base assembly. The at least one aperture may include a plurality of apertures formed by at least a first portion of each of a plurality of base apertures of the base assembly being respectively aligned with at least a second portion of each of a plurality of cover apertures of the cover assembly.

In at least some exemplary embodiments, the exemplary disclosed method may include providing a first housing having a first cavity (e.g., first cavity 342 or first cavity 1342), disposing a second housing, which includes a second cavity (e.g., second cavity 455a or second cavity 1455a) and at least one aperture, in the first cavity, generating a first airflow through the first housing using a first fan assembly, and generating a second airflow from the second cavity to the first cavity via the at least one aperture using a second fan assembly. The exemplary disclosed method may also include varying a total sound generated by the first airflow and the second airflow based on varying a first speed of a first motor driving a first fan of the first fan assembly independently from varying a second speed of a second motor driving a second fan of the second fan assembly. Varying the first speed and varying the second speed may include at least one selected from the group of remotely controlling a controller using a user device, physically manipulating at least one user interface disposed on the first housing or the second housing, and combinations thereof. The exemplary disclosed method may further include sensing at least one of an ambient temperature and an ambient sound and varying at least one of the first speed and the second speed based on the at least one of sensed ambient temperature and ambient sound. Generating the first airflow may include rotating a first fan of the first fan assembly about an axis in a first rotational direction, and generating the second airflow may include rotating a second fan of the second fan assembly about the axis in a second rotational direction that is opposite to the first rotational direction. The exemplary disclosed method may also include varying the second airflow based on at least one of varying a speed of a motor driving a fan of the second fan assembly and varying a size of the at least one aperture. Varying the size of the at least one aperture may include rotating a cover assembly of the second housing that includes a plurality of cover apertures relative to a base assembly of the second housing that includes a plurality of base apertures so that a respectively aligned portion of each of the plurality of cover apertures and the plurality of base apertures varies.

In at least some exemplary embodiments, the exemplary disclosed apparatus may include a first housing having a first cavity (e.g., first cavity 342 or first cavity 1342), a second housing removably disposed (e.g., a modular second housing) in the first housing and including a second cavity (e.g., second cavity 455a or second cavity 1455a) and a plurality of apertures, a first fan assembly configured to generate a first airflow through the first housing, and a second fan assembly configured to generate a second airflow from the second cavity to the first cavity via the plurality of apertures. The first fan assembly may include a first fan that rotates about a same axis as a second fan of the second fan assembly, the first fan rotating in a first rotational direction that is opposite to a second rotational direction of the second fan. The second fan may be disposed in the second housing. A first step portion forming a first recess that faces away from the second cavity and a second step portion forming a second recess that faces toward the second cavity may be disposed in each of the plurality of apertures. The exemplary disclosed apparatus may also include a controller configured to vary a total sound generated by the first airflow and the second airflow based on varying a first speed of a first motor driving the first fan independently from varying a second speed of a second motor driving the second fan.

The exemplary disclosed system, apparatus, and method may be used in any suitable application for providing a flow of air. For example, the exemplary disclosed system, apparatus, and method may be used in any suitable application for cooling and heating such as HVAC applications. In at least some exemplary embodiments, the exemplary disclosed system, apparatus, and method may be used in any suitable application involving a fan or blower such as in residential applications, commercial applications, industrial applications, maritime (e.g., on waterborne vessels) or aviation (e.g., on aircraft) applications, and/or any other suitable application in which a flow of air may be provided (e.g., in which a fan or blower may be utilized). In at least some exemplary embodiments, the exemplary disclosed system, apparatus, and method may be used in any suitable application including a fan or propeller such as an aircraft fan or propeller.

The exemplary disclosed system, apparatus, and method may provide an efficient and effective technique for repurposing a fan hub to improve fan acoustics without a loss of airflow. The exemplary disclosed system, apparatus, and method may also provide for correcting temperature imbalances in spaces to be cooled such as homes with bedrooms that are closed at night. The exemplary disclosed system, apparatus, and method may further efficiently and effectively provide cooling of a space without generating residual heat energy.

Figure 19:
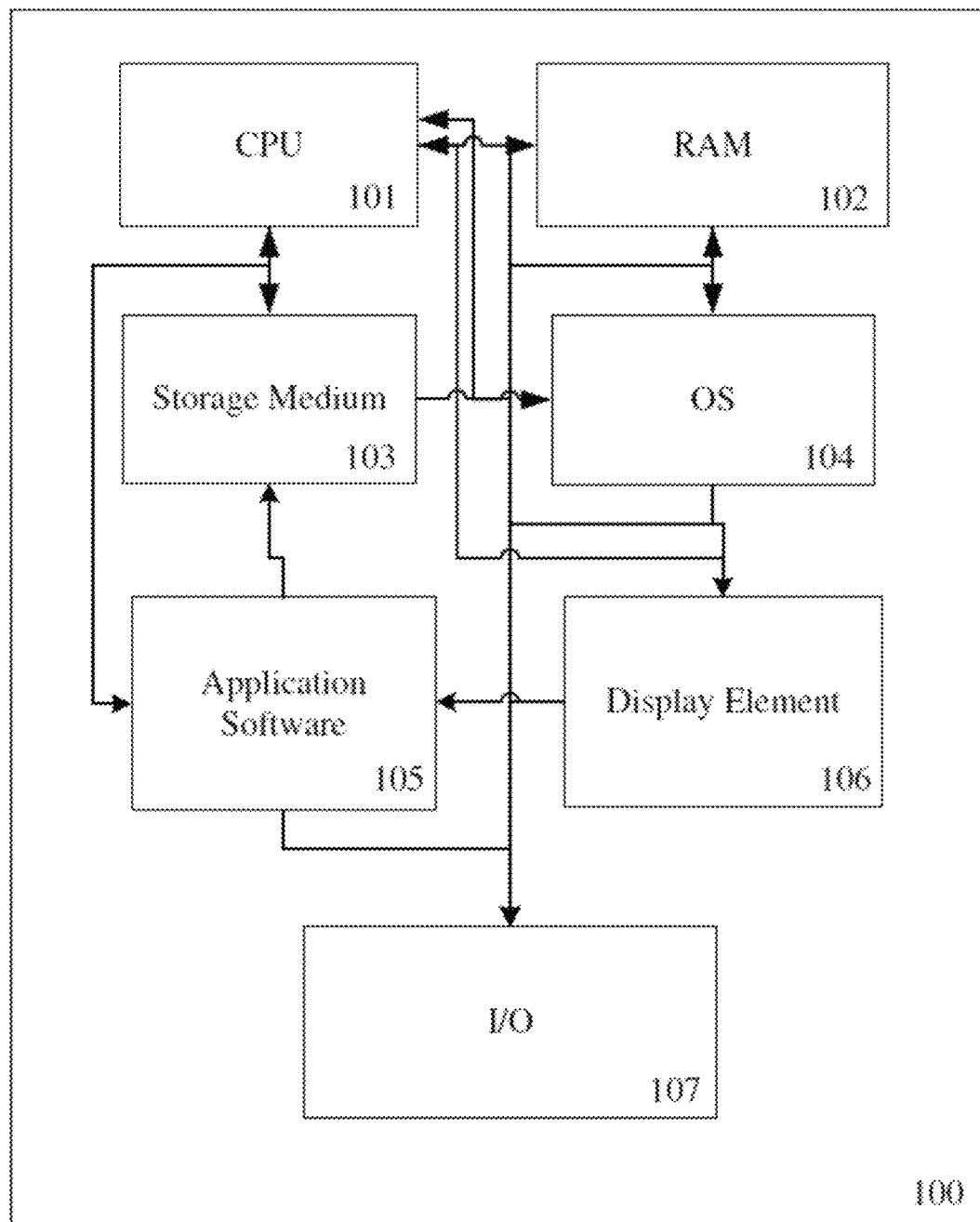
FIG. 19 is a schematic illustration of an exemplary computing device, in accordance with at least some exemplary embodiments of the present disclosure.

An illustrative representation of a computing device appropriate for use with embodiments of the system of the present disclosure is shown in FIG. 19. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wi-Fi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 20, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 20:
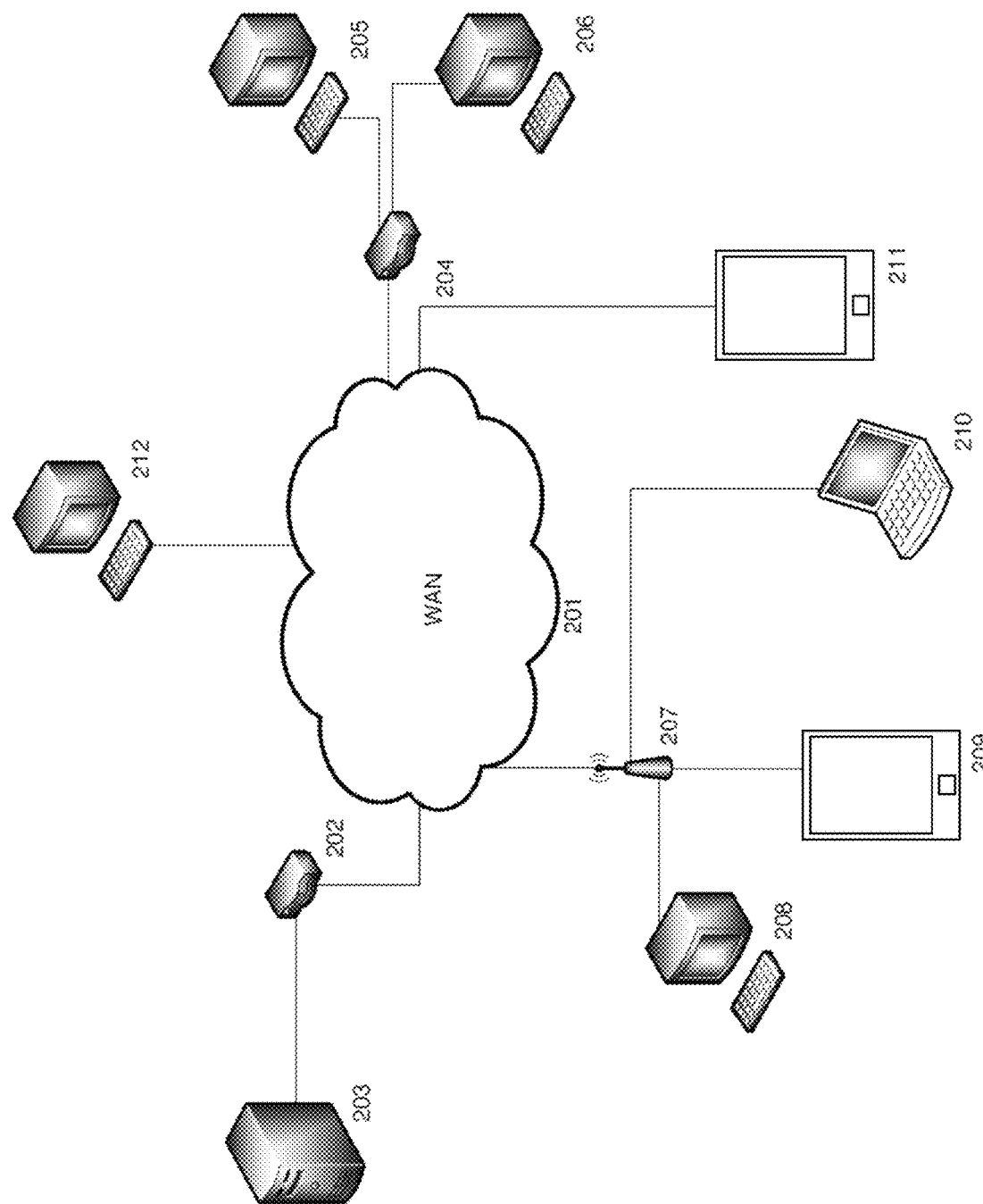
FIG. 20 is a schematic illustration of an exemplary network, in accordance with at least some exemplary embodiments of the present disclosure.

Referring to FIG. 20, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 20, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GSM, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including text, binary data, image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system may for example utilize collected data to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary disclosed system may utilize neural network-based artificial intelligence to predictively assess risk. For example, the exemplary neural network may include a plurality of input nodes that may be interconnected and/or networked with a plurality of additional and/or other processing nodes to determine a predicted result (e.g., a location as described for example herein).

For example, exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. For example, the prediction algorithms and approach may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets. Also for example, exemplary artificial intelligence processes may include processing for training a machine learning model to make predictions based on data collected by the exemplary disclosed sensors.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation Kotlin, Swift, C#, PHP, C, C++, Assembler, Java, HTML, JavaScript, CSS, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of mobile applications, firmware for monitoring devices, web-based computer software, and so on, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies.

Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An apparatus, comprising:
a first housing having a first cavity;
a second housing disposed in the first housing and including a second cavity and at least one aperture, wherein the second housing includes a base assembly and a cover assembly that is rotatably attached to the base assembly;
a first fan assembly disposed in the first housing, wherein the first fan assembly is configured to generate a first airflow through the first housing;
a second fan assembly disposed in the second cavity of the second housing, wherein the second fan assembly is configured to generate a second airflow from the second cavity to the first cavity via the at least one aperture;
a first motor positioned between the first fan assembly and an inner side of the second fan assembly; and
a second motor positioned such that either the first fan assembly or the second fan assembly is located between the first motor and the second motor.

2. The apparatus of claim 1, further comprising a controller integrated into the first housing, wherein the controller is configured to adjust at least one of a speed of the second fan assembly and the at least one aperture in the second housing.

3. The apparatus of claim 1, wherein the second fan assembly includes a second fan having a second diameter.

4. The apparatus of claim 3, wherein the first fan assembly includes a first fan having a first diameter that is greater than a diameter of the second housing.

5. The apparatus of claim 1, wherein the first fan assembly includes a first fan driven by a first shaft and the second fan assembly includes a second fan driven by a second shaft, the first shaft and the second shaft being concentric shafts.

6. The apparatus of claim 1, wherein the first housing is one of a table fan housing supported by a stand or a ceiling fan housing supporting the second fan assembly that is a ceiling fan assembly.

7. The apparatus of claim 1, wherein a first step portion forming a first recess that faces away from the second cavity is disposed in the at least one aperture.

8. The apparatus of claim 7, wherein a second step portion forming a second recess that faces toward the second cavity is disposed in the at least one aperture.

9. The apparatus of claim 1, wherein the at least one aperture includes a plurality of apertures formed by at least a first portion of each of a plurality of base apertures of the base assembly being respectively aligned with at least a second portion of each of a plurality of cover apertures of the cover assembly.

* * * * *